United States Patent [19]
Yagi et al.

[11] Patent Number: 6,002,546
[45] Date of Patent: Dec. 14, 1999

[54] MAGNETIC DISK APPARATUS WITH VISCO ELASTIC SHOCK DAMPENING

[75] Inventors: Norio Yagi; Kenichi Myokan; Takashi Matsumoto, all of Kawasaki; Katuhiko Oizumi, Higashine, all of Japan

[73] Assignee: Fujitsu Limited, Kawasaki, Japan

[21] Appl. No.: 08/770,682

[22] Filed: Dec. 17, 1996

Related U.S. Application Data

[63] Continuation of application No. 08/351,727, Dec. 7, 1994, abandoned, which is a continuation of application No. 08/128,348, Sep. 28, 1993, abandoned.

[30] Foreign Application Priority Data

Feb. 10, 1993 [JP] Japan ................................... 5-045965

[51] Int. Cl.$^6$ .................................................. G11B 33/14
[52] U.S. Cl. ...................................................... 360/97.02
[58] Field of Search ........................... 360/97.01, 97.02, 360/97.03, 105, 106

[56] References Cited

U.S. PATENT DOCUMENTS

| | | | |
|---|---|---|---|
| 3,816,911 | 6/1974 | Knappenberger | 29/626 |
| 4,812,932 | 3/1989 | Hishinuma et al. | 360/97.01 |
| 4,980,786 | 12/1990 | O'Sullivan et al. | 360/97.03 |
| 5,025,336 | 6/1991 | Morehouse et al. | 360/97.01 |
| 5,079,655 | 1/1992 | Yagi | 360/97.02 |
| 5,084,861 | 1/1992 | Takahashi | 369/291 |
| 5,140,478 | 8/1992 | Yoshida | 360/97.01 |
| 5,214,549 | 5/1993 | Baker et al. | 360/97.01 |
| 5,235,482 | 8/1993 | Schmitz | 360/97.02 |
| 5,241,436 | 8/1993 | Kawabatal et al. | 360/97.01 |
| 5,282,099 | 1/1994 | Kawagoe et al. | 360/97.01 |
| 5,345,352 | 9/1994 | Nakano | 360/97.01 |
| 5,424,891 | 6/1995 | Oda et al. | 360/128 |
| 5,430,589 | 7/1995 | Moir et al. | 360/97.02 |

FOREIGN PATENT DOCUMENTS

| | | | |
|---|---|---|---|
| 59-63077 | 4/1984 | Japan . | |
| 61-151891 | 7/1986 | Japan | 360/97.01 |
| 62-65279 | 3/1987 | Japan . | |
| 63-257987 | 10/1988 | Japan | 360/97.03 |
| 3168985 | 7/1991 | Japan . | |
| 3-260980 | 11/1991 | Japan | 360/137 |
| 4-166396 | 6/1992 | Japan . | |
| 4-368690 | 12/1992 | Japan . | |
| 6-236674 | 8/1994 | Japan . | |

*Primary Examiner*—David L. Ometz
*Attorney, Agent, or Firm*—Greer, Burns & Crain, Ltd.

[57] ABSTRACT

A magnetic disk apparatus which protects magnetic disks from being damaged by an external shock applied thereto. The magnetic disk apparatus includes a shock absorber provided in the enclosure for absorbing a shock of the magnetic disk caused by vibration of the magnetic disk. Alternatively or additionally the magnetic disk apparatus includes a shock absorber for covering a surface of the enclosure which houses the disk drive components.

15 Claims, 20 Drawing Sheets

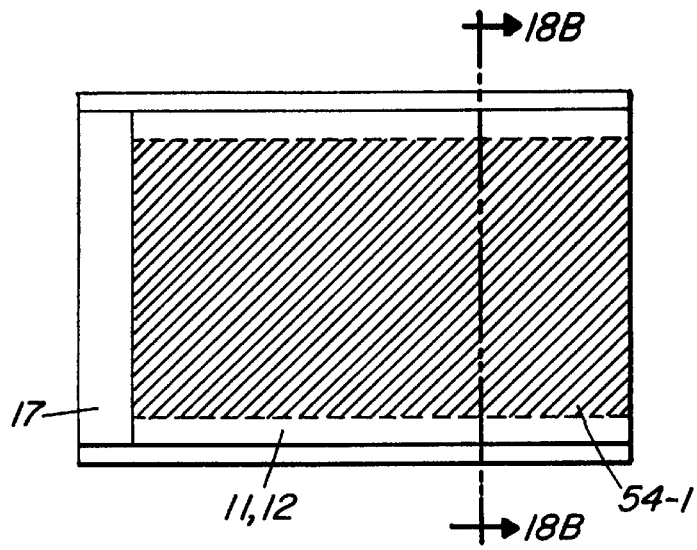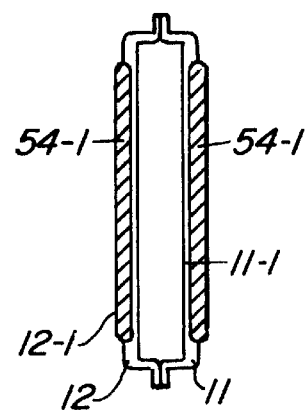
Fig. 18A  Fig. 18B
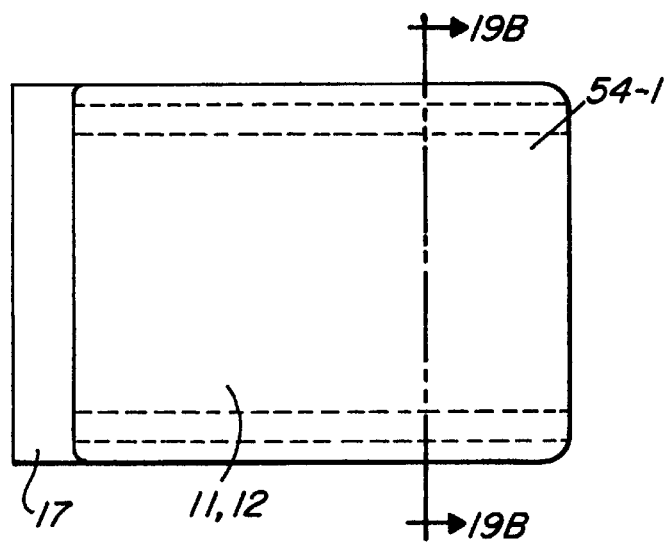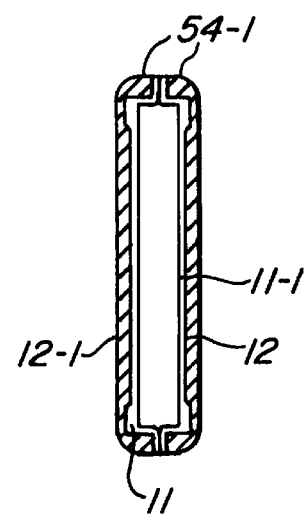
Fig. 19A  Fig. 19B

MAGNETIC DISK APPARATUS WITH VISCO ELASTIC SHOCK DAMPENING

This application is a continuation of application Ser. No. 08/351,727 filed on Dec. 7, 1994, now abandoned, which was a continuation of Ser. No. 08/128,348 filed on Sep. 28, 1993 now abandoned.

BACKGROUND OF THE INVENTION

1. Field of the Invention

The present invention relates to a magnetic disk apparatus having magnetic disks and magnetic heads provided within its enclosure, and, more particularly, to a magnetic disk apparatus having excellent shock resistance to an externally-applied shock.

2. Description of the Related Art

A magnetic disk apparatus has rotatable magnetic disks and magnetic heads for writing and reading information on and from the magnetic disks. Each magnetic head is positioned over a desired track position of the associated magnetic disk to read data from that track or write data thereon.

This magnetic disk apparatus is widely used as an external storage device. Recent demand tends toward downsizing of computer systems using such a magnetic disk apparatus. Particularly, the use of such a magnetic disk apparatus in a notebook type computer, a word processor, a portable, palmtop computer and so forth has become popular. There is therefore a demand for small and slim magnetic disk apparatuses, such as a 1.8-inch magnetic disk apparatus. Micro magnetic disk apparatuses with a size of 1.8 inches or less have the size of a credit card, This type of magnetic disk apparatus can be detachably mounted in a computer and can be handled alone.

When this magnetic disk apparatus is handled alone unlike the one installed in a computer, it is susceptible to an external magnetic field and external electric noise, which may cause read/write errors. Similarly, if the detachable magnetic disk apparatus is dropped on a floor or the like by accident, it would receive a great shock, which could damage the internal components.

Such a magnetic disk apparatus therefore requires good shock resistances resistance to external magnetic fields and resistance to electric noise. To reduce an external shock on the magnetic disk apparatus it has been proposed to provide a shock absorber near the magnetic heads to prevent the head from being damaged by a shock (see Japanese Unexamined Patent Publication No. 168985/1991).

To protect magnetic disks from the internal magnetic field generated by the actuator in the magnetic disk apparatus, it has been proposed that the base on which the actuator is mounted should be made of a ferromagnetic material (see Japanese Unexamined Patent Publication No. 63077/1984).

However, the conventional shock absorbing scheme for magnetic disk apparatuses probably raises the following problem. In a small magnetic disk apparatus, the shock resistance can be improved without the use of the aforementioned shock absorbers by designing the magnetic heads smaller to reduce the shock mass. In other words, even if the magnetic disk apparatus receives a shock, the magnetic heads or magnetic disks can be prevented from being damaged by the vibration of the magnetic heads due to the lighter mass of each magnetic head (e.g., 1 g or below).

The mass of the magnetic disk, however small it is made, is larger than the mass of the magnetic head. In a slim magnetic disk apparatus, the clearance between the magnetic disks and the housing of the magnetic disk apparatus is small. So is the gap between the magnetic disks. When magnetic disks in a slim magnetic disk apparatus vibrate by an external shock applied thereto, therefore, the magnetic disks may hit against the inner wall of the housing of the magnetic disk apparatus or hit against one another, and may thus be damaged. This can disable data recording/reproduction on the damaged disks. Further, when the magnetic disks vibrate, their magnetic heads may hit against the housing so that the magnetic disks and the magnetic heads may both be damaged.

The aforementioned proposal of providing shock absorbers is a measure to cope with an external shock in the case where a magnetic disk apparatus is installed in a computer or the like, the magnitude of the shock is about 100 G to 200 G. However, in a possible case where the magnetic disk apparatus is dropped on a floor or the like, the magnitude of the shock exceeds 200 G and rises above 300 G. Accordingly, the magnetic disks securely attached to the spindle motor vibrate and protected by the conventional shock absorbers, possibly causing a likely damage to the magnetic disks, the magnetic heads, etc.

SUMMARY OF THE INVENTION

It is therefore a primary object of the present invention to provide a magnetic disk apparatus designed to prevent magnetic disks from being damaged by an external shock.

It is another object of this invention to provide a magnetic disk apparatus with improved shock resistance to an external shock.

It is a further object of this invention to provide a magnetic disk apparatus which improves the shock resistance by a simple method.

To achieve the foregoing and other objects and in accordance with the purpose of the present invention, according to one aspect of this invention, there is provided a magnetic disk apparatus which comprises at least one magnetic disk; rotation means for rotating the magnetic disk; a magnetic head for recording and reproducing information on and from the magnetic disk; an actuator for supporting the magnetic head and moving the magnetic head to a given position on the magnetic disk; an enclosure for covering those individual components; and a shock absorber provided in the enclosure for absorbing a shock of the magnetic disk caused by vibration of the magnetic disk.

The shock absorber is provided to absorb a shock on the magnetic disks caused due to the vibration of the disks by an external shock. If an external shock is applied to the magnetic disk apparatus, the shock on the magnetic disks can be reduced, thus preventing the magnetic disks, the magnetic heads, and other components from being damaged. Since top and bottom portions within the enclosure included empty space except for where the spindle and the actuator are provided, the shock absorber can be provided in the vicinity of the magnetic disks without changing the height of the magnetic disk apparatus.

According to another aspect of this invention, a magnetic disk apparatus comprises at least one magnetic disk; rotation means for rotating the magnetic disk; a magnetic head for recording and reproducing information on and from the magnetic disk; an actuator for supporting the magnetic head and moving the magnetic head to a given position on the magnetic disk; an enclosure for covering those individual components; and a shock absorber for covering a surface of the enclosure.

Since the enclosure is covered with the shock absorber, an external shock, if applied to the magnetic disk apparatus, can be suppressed. This can prevent the magnetic disks, magnetic heads, the spindle, and other components located inside the enclosure, from being damaged.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 18A is a diagram showing the exterior of a still another modification of the magnetic disk apparatus of this invention;

FIG. 18B is a cross-sectional view of the magnetic disk apparatus in FIG. 18A;

FIG. 19A is a diagram showing the exterior of a still further modification of the magnetic disk apparatus of this invention;

FIG. 19B is a cross-sectional view of the magnetic disk apparatus in FIG. 19A;

DETAILED DESCRIPTION OF THE PREFERRED EMBODIMENTS

Figure 1:
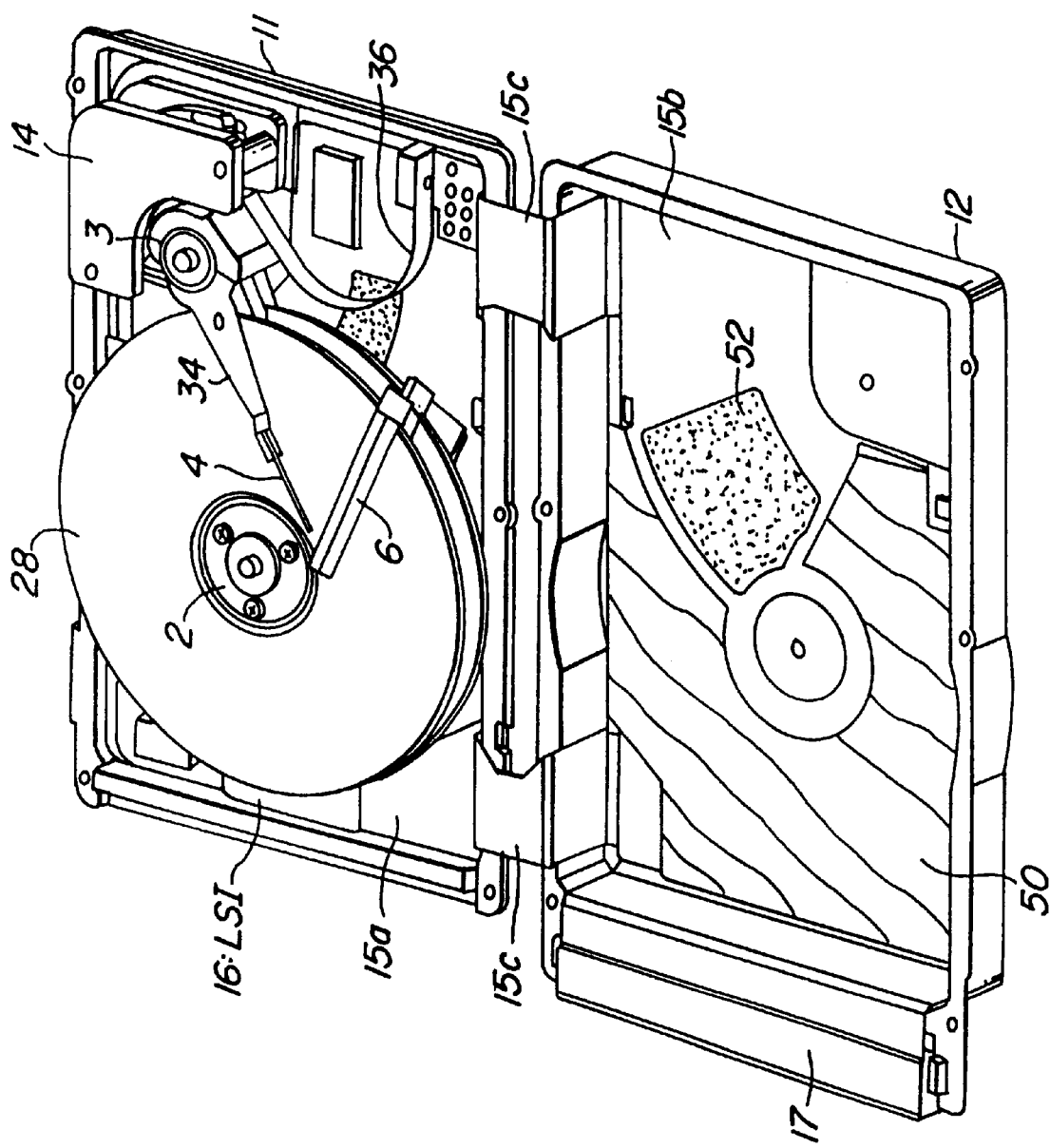
FIG. 1 is a perspective view of a magnetic disk apparatus according to one embodiment of the present invention, showing the interior.
Figure 2:
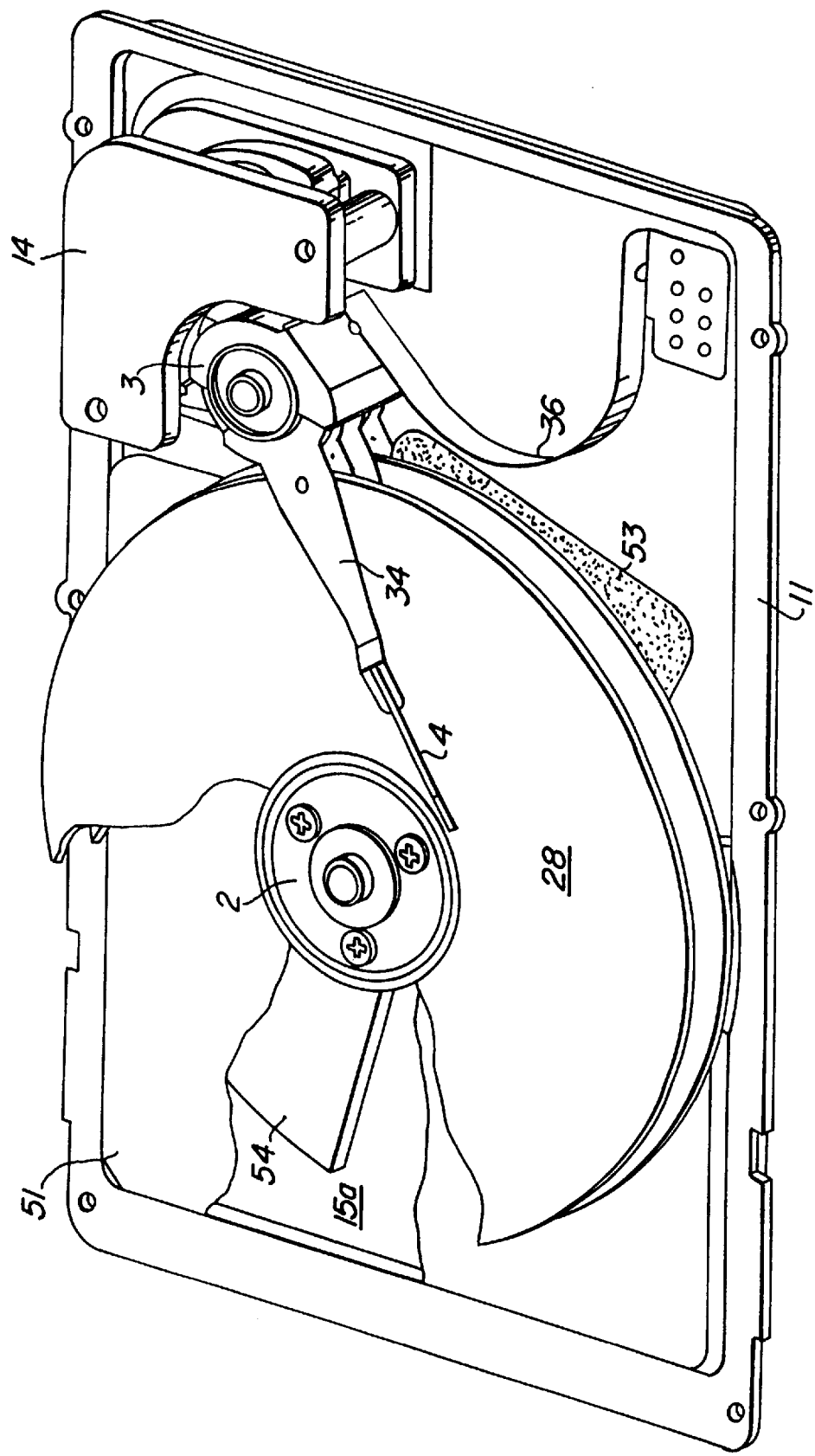
FIG. 2 is a perspective view showing the base side of the magnetic disk apparatus in FIG. 1.
Figure 3:
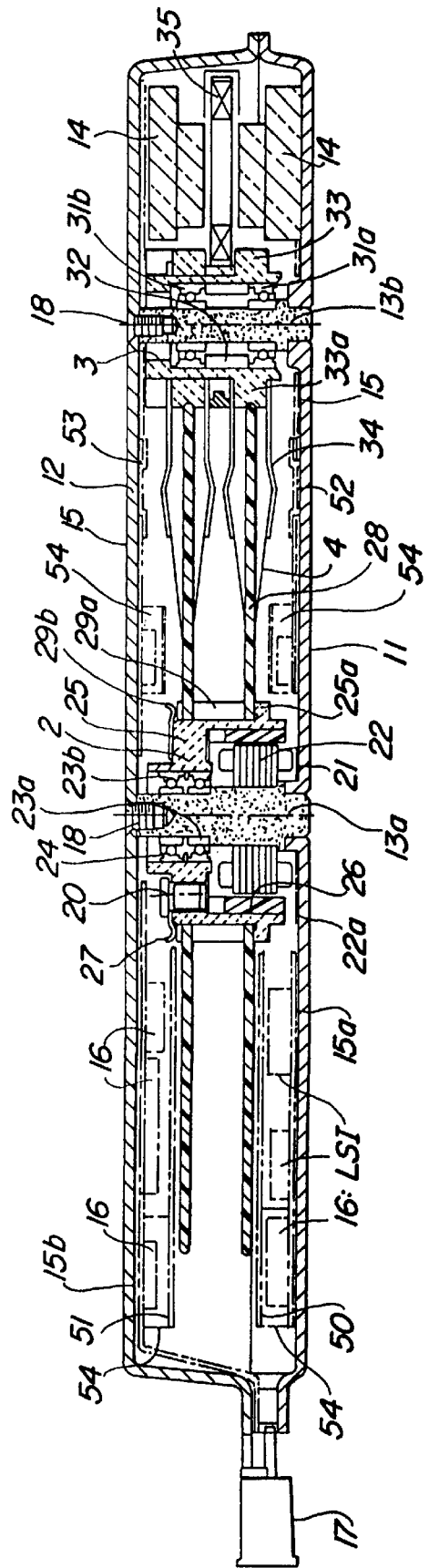
FIG. 3 is a cross-sectional view of the magnetic disk apparatus in FIG. 1.
Figure 4:
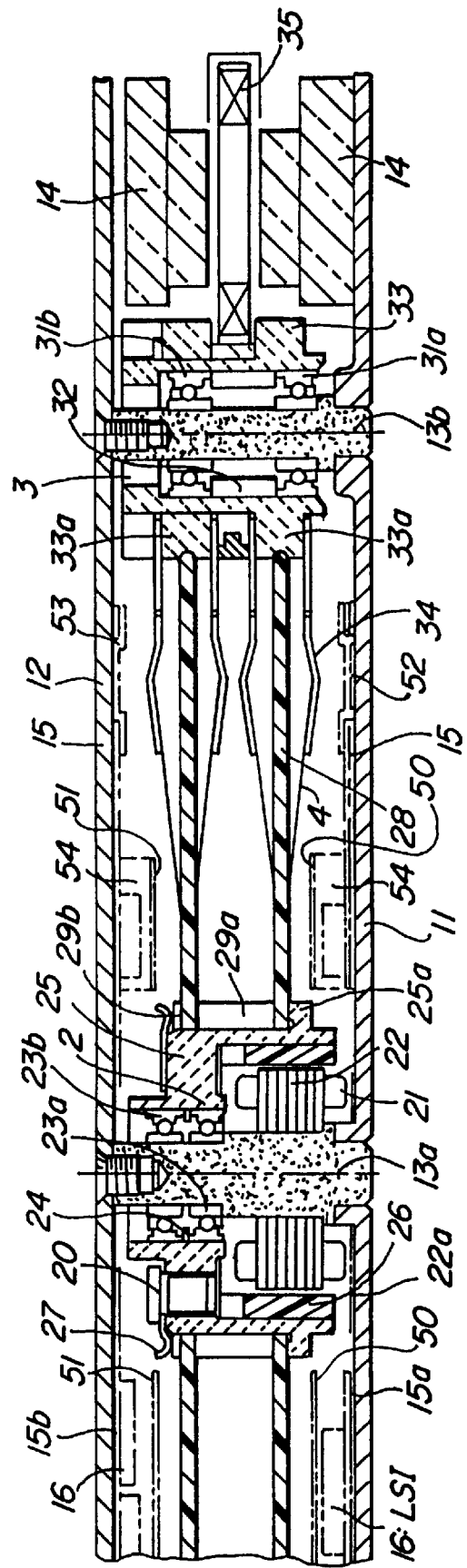
FIG. 4 is an enlarged view of the essential portions of the magnetic disk apparatus in FIG. 3.

FIG. 1 is a perspective view of a magnetic disk apparatus according to one embodiment of the present invention, showing the interior, FIG. 2 is a perspective view showing the base side of the magnetic disk apparatus in FIG. 1, FIG. 3 is a cross-sectional view of the magnetic disk apparatus in FIG. 1, and FIG. 4 is an enlarged view of essential portions of the magnetic disk apparatus in FIG. 3.

As shown in FIGS. 1 and 2, a base 11 constitutes a bottom plate of a disk enclosure (hereinafter called "housing") of a magnetic disk apparatus. The base 11 is made of a ferromagnetic material, such as iron or Permalloy, to shield an external magnetic field. A flexible printed board (circuit board) 15a is provided on the bottom of the base 11, except for where a spindle motor 2 and an actuator 3, both to be described later, are provided. Mounted on this printed circuit board 15a is an LSI (circuitry for magnetic recording and reproduction) 16.

A plurality of shock absorbers 54, which will be described later, are provided on this printed circuit board 15a in the vicinity of the periphery of magnetic disks 28, as shown in FIG. 2. Further, a shield member 51 made of a metal plate, such as a copper plate, having a good conductivity, is provided on the shock absorbers 54 for accomplishing electric shielding. A ferromagnetic member 53 is provided in association with the location of magnetic heads 4 to provide magnetic shield for the magnetic heads 4.

Provided on the right side of the base 11 are a magnetic circuit 14 and the actuator 3. Attached to this actuator 3 are arms 34 to which contact type magnetic heads (assembly) 4 are provided. The magnetic heads 4 will be described later with reference to FIGS. 5 through 8. Attached to the side of the actuator 3 is a flexible cable 36 provided with a head IC that is connected to the magnetic heads 4 by lead wires. The other end of the flexible cable 36 is securely and electrically connected to the printed circuit board 15a.

Provided in the center of the base 11 is the spindle motor 2 that rotates the magnetic disks 28. The magnetic disks 28, in the range of 1.8 inches in diameter, are attached to this spindle motor 2. The magnetic disks 28 are provided with a dust shield member 6 which prevents dust on the magnetic disks 28 from reaching the distal ends of the magnetic heads 4.

As shown in FIG. 1, a cover 12 constitutes an upper cover of the housing (disk enclosure) which covers the base 11. The cover 12 is made of a ferromagnetic material, such as iron plate or Permalloy, to shield the disk apparatus external magnetic fields. A flexible printed board (circuit board) 15b is provided on the bottom of the cover 12. This printed circuit board 15b is connected to the printed circuit board 15a of the base 11 by link portions 15c. Mounted on the printed circuit board 15b is an LSI (circuitry for magnetic recording and reproduction) which will be discussed later with reference to FIG. 4.

A plurality of shock absorbers 54, which will be described later, are provided on this printed circuit board 15a in the vicinity of the periphery of magnetic disks 28. Further, a shield member 50 made of a metal plate, such as a copper plate, having a good conductivity, is provided on the shock absorbers 54 for providing electric shield. A ferromagnetic member 52 (e.g., iron plate, Permalloy or ferrite) is provided in association with the location of the magnetic heads 4 to provide magnetic shield for the magnetic heads 4.

A connector 17 connected to the printed circuit board 15b is further provided on the left end portion of the cover 12. This magnetic disk apparatus is electrically connected to an external computer or the like via this connector 17.

The magnetic disk apparatus measuring, 3.37 inches (85.6 mm) long, 2.13 inches (54 mm) wide and 0.41 inch (10.5 mm) tall, is a micro disk apparatus with the approximate size of a credit card.

FIGS. 3 and 4 show the cross section of a complete assembly of the magnetic disk apparatus in FIG. 1 with the cover 12 covering the base 11. In FIGS. 3 and 4, shafts 13a and 13b respectively constitute the fixed rotary shafts of the spindle motor 2 and the actuator 3. The lower ends of the shafts 13a and 13b are secured to the base 11 through temperature fitting. The upper ends of the shafts 13a and 13b are securely fastened to the cover 12 by screws 18.

Mounted on the motor shaft 13a is the spindle motor 2, which supports two magnetic disks 28 and rotates at a high speed (e.g., 3600 rpm). Mounted on the actuator shaft 13b is the actuator 4, which holds the magnetic heads 4, and moves and positions each magnetic head 4 to a target track on the associated magnetic disk 28.

Provided on the inner walls of the base 11 and cover 12 are the flexible printed circuit boards 15a and 15b on which LSIs (servo controller, DC motor controller, read/write controller, interface controller, etc.) 16 are mounted. The printed circuit board 15b is connected to the connector 17 which is held by the base 11 and the cover 12.

With the connector 17 coupled to the receiving connector of an external device (e.g., a notebook type personal computer), the magnetic disk apparatus serves as a storage device for the external device.

The spindle motor 2 has an in-spindle structure in which the outside diameter of the DCM (direct current motor) hub or the rotor yoke is nearly equal to the inner diameter of the magnetic disks 28. A stator 21, formed by a lamination of silicon steel plates, is provided around the motor shaft 13a. This stator 21 is secured to the shaft 13a by an adhesive. A copper coil 22 is wound around the stator 21. A wire 22a led from this copper coil 22 is soldered to a terminal on the printed circuit board 15a to supply a drive current to the spindle motor 2.

Reference numeral "23a" denotes a rear bearing, and reference numeral "23b" a top bearing. A spacer 24 serves to keep the gap between the rear bearing 23a and the top bearing 23b. The inner rings of the rear bearing 23a and the top bearing 23b are secured to the motor shaft 13a by an adhesive. Reference numeral "25" is a motor hub made of an iron member. The inner periphery of the motor hub 25 is adhered to the outer rings of the rear bearing 23a and top bearing 23b.

A magnet 26 is attached to that portion of the motor hub 25 which faces the stator 21. The stator 21 and the magnet 26 of the motor hub 25 constitute a magnetic circuit. When the coil 22 is excited and de-excited alternately, driving power is generated in the magnetic circuit, causing the motor hub 25 to rotate.

Two magnetic disks 28 are sandwiched between a collar 25a of the motor hub 25 and a ring spring 27, with spacer rings 29a and 29b in between. By securing and compressing this ring spring 27 to the motor hub 25 by a screw 20, compressive force acts between the collar 25a of the motor hub 25 and the ring spring 27, thus securing the two magnetic disks 28 to the spacer rings 29a and 29b.

The actuator 3 will now be described. Referring to FIG. 4, reference numeral "31a" is a rear bearing and reference numeral "31b" is a top bearing. A spacer 32 keeps the gap between the rear bearing 31a and the top bearing 31b. The inner rings of the rear bearing 31a and top bearing 31b are secured adhered to the actuator shaft 13b. An aluminum block 33 has its inner periphery adhered to the outer rings of the rear bearing 31a and top bearing 31b. Two collars 33a are provided on one end portion of the block 33, and four arms 34 are secured to the respective sides of the collars 33a, one arm to each side of each collar by measuring, such as an adhesive.

The magnetic heads 4 are securely adhered to the distal ends of the respective arms 34. Each magnetic head 4 faces one surface of the associated magnetic disk 28. A coil 35 is fixed to the opposite side of the block 33 to the collars 33a by resin molding. The magnetic circuit 14, constituted by the magnet and iron yoke, is provided on the base 11. The coil 35 is held in the magnetic gap of the magnetic circuit 14.

The coil 35 is connected to a terminal of the printed circuit board 15a via the flat cable 36 provided on the side of the aluminum block 33 of the actuator 3. When a current flow through the coil 35, driving power is generated in the coil 35, causing the actuator 3 to rotate around the actuator shaft 13b. In accordance with a track position signal read by the magnetic heads 4, the servo controller mounted on the printed circuit board 15a controls the current flowing through the coil 35 to move and position each magnetic head 4 to a target track on the associated magnetic disk 28.

Figure 5:
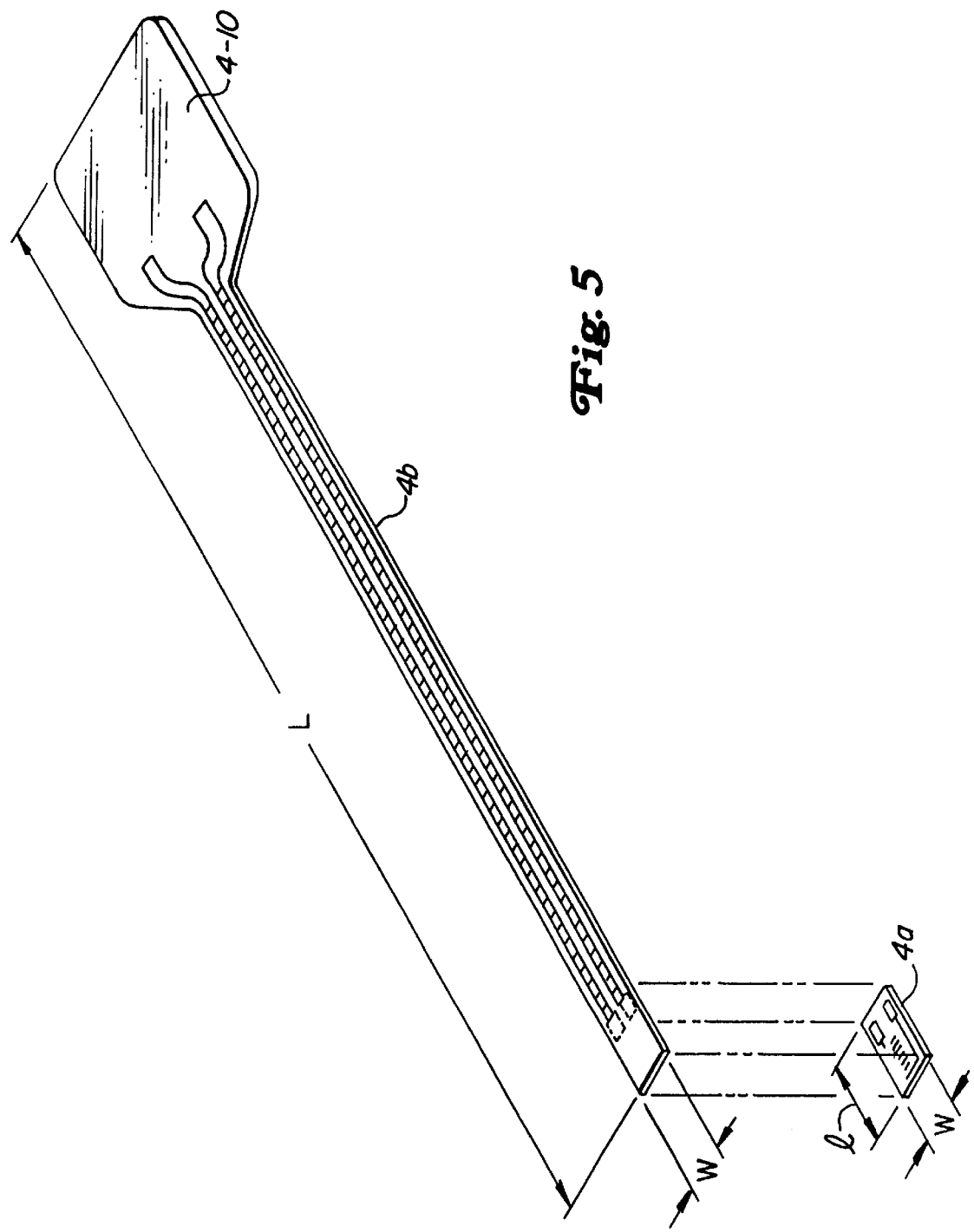
FIG. 5 is an exploded perspective view of a magnetic head assembly shown in FIG. 1.
Figure 7:
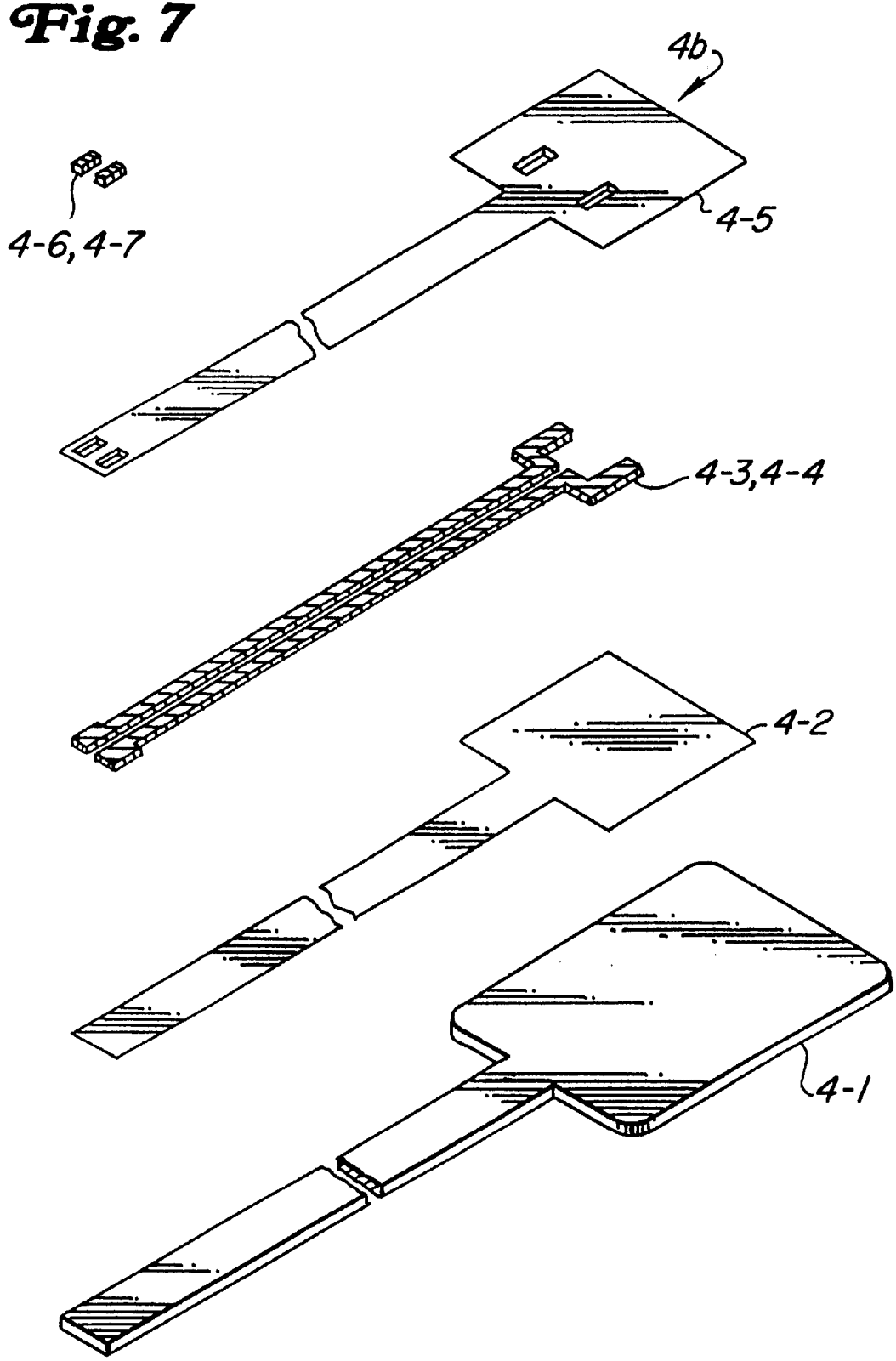
FIG. 7 is an exploded perspective view of a flexible support shown in FIG. 5.
Figure 8:
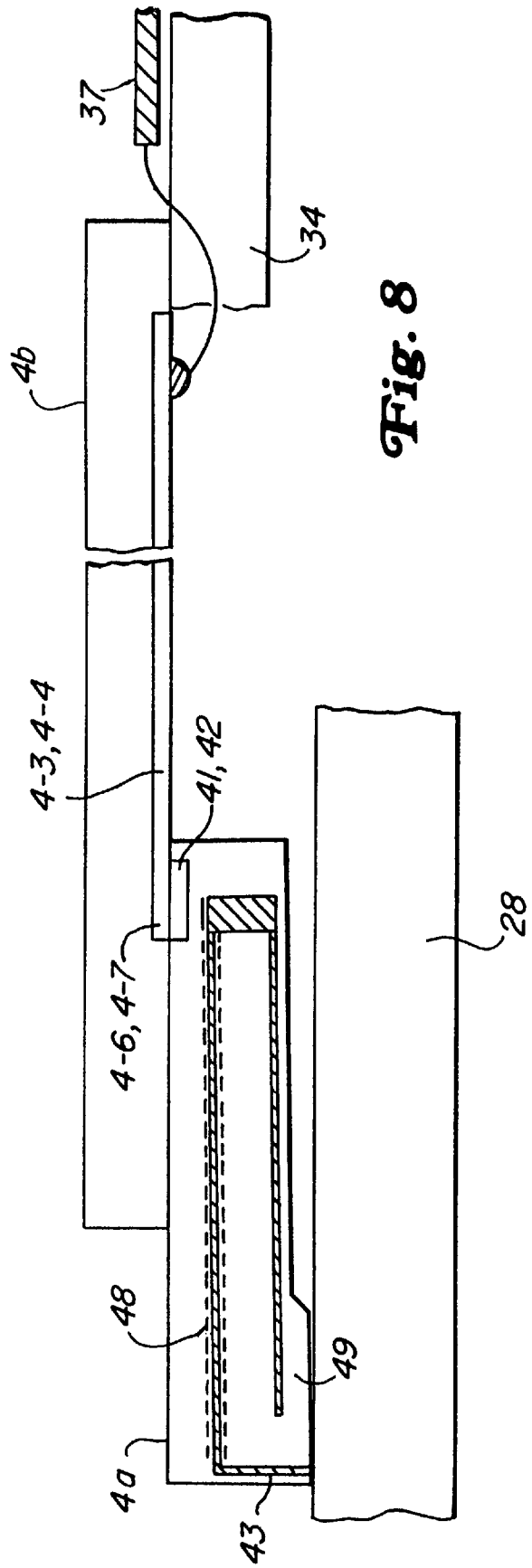
FIG. 8 is a cross-sectional view of the magnetic head assembly shown in FIG. 5.

The magnetic heads of the magnetic disk apparatus will now be described. FIG. 5 is an exploded perspective view of the magnetic head assembly shown in FIG. 1, FIG. 6A is a perspective view of a head chip shown in FIG. 5, FIG. 6B is a cross-sectional view of the head chip in FIG. 5, FIG. 7 is an exploded perspective view of a flexible support shown in FIG. 5, and FIG. 8 is a cross-sectional view of the magnetic head assembly shown in FIG. 5.

As shown in FIG. 5, the magnetic head assembly 4 comprises a head chip 4a and a flexible support 4b which supports this head chip 4a. The head chip 4a is formed in a thin-film forming process to have a width W of 0.42 mm, a length 1 of 0.8 mm and a thickness of 0.04 mm, and weights 100 mg or less. The head chip 4a will be described later. The flexible support 4b has a width W of 0.42 mm, a length L of 10.7 mm and a thickness of 0.05 mm, and will also be described later. All dimensions represent the ideal conditions of a range of values.

Figure 6A:
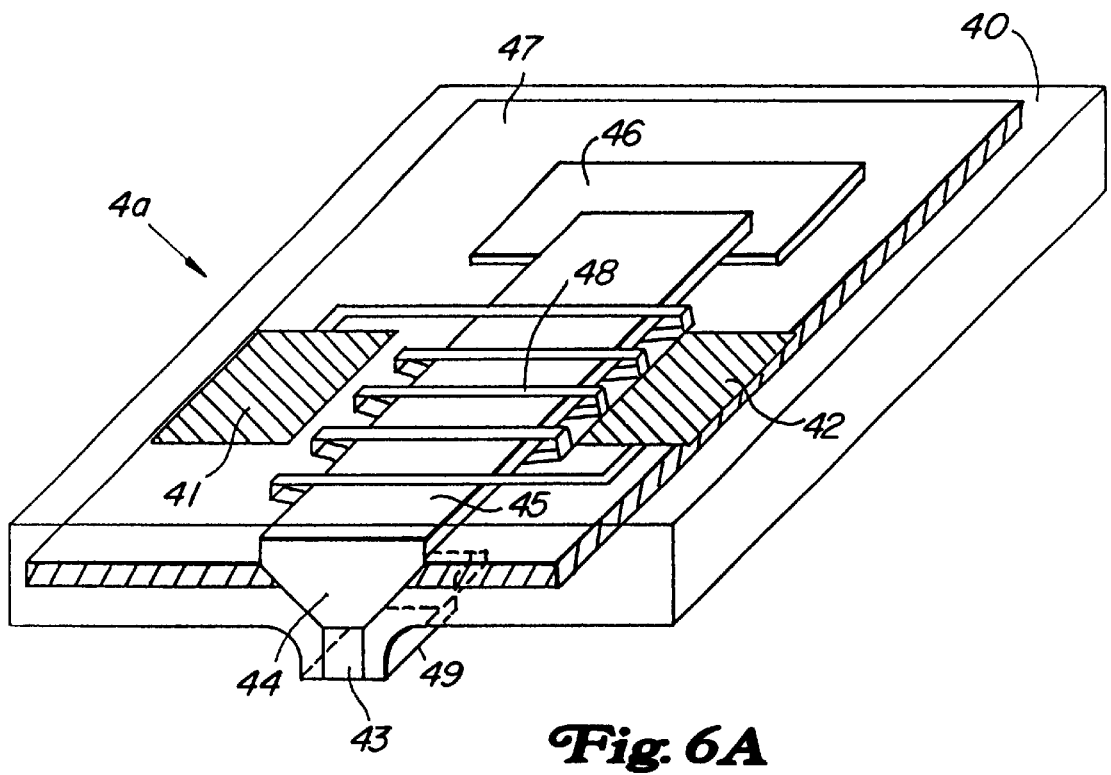
FIG. 6A is a perspective view of a magnetic head chip shown in FIG. 5.
Figure 6B:
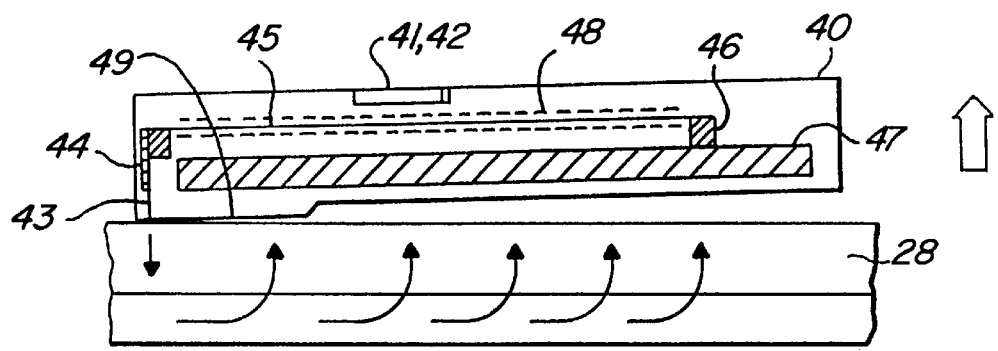
FIG. 6B is a cross-sectional view of the magnetic head chip shown in FIG. 5.

In FIGS. 6A and 6B, the head chip 4a is a probe type vertical magnetic recording head. This head chip 4a comprises a pole (main magnetic pole) 43, a yoke 44, a core 45, a return stud 46 and a return yoke 47, all of which constitute a low magnetic resistance path. A high magnetic resistance gap is formed between the pole 43 and the return yoke 47. A contact pad 49 made of a solid member is provided at the pole 43. A spiral coil 48 is provided around the core 45. A pair of connector terminals 41 and 42, made of gold (Au), are connected to the coil 45 in an exposed manner. Those connector terminals 41 and 42 are each formed by depositing a thin film in an insulating layer.

As shown in FIG. 6B, the solid contact pad 49 of this head chip 4a contacts the associated two-layer magnetic disk 28 of a vertical magnetic recording type for data recording/reproduction. The magnetic force from the pole 43 returns, dispersed, between the pole 43 and the return yoke 47 from the bottom layer of the magnetic disk 28, so that only that portion of the magnetic disk 28 which lies directly under the pole 43 is magnetized, thus accomplishing contact type vertical recording.

At this time, as the solid contact pad 49 of the head chip 4a contacts the magnetic disk 28, the head chip 4a has less wear-out even through contact recording. This can therefore accomplish stable contact recording and high-density recording.

The head chip 4a is formed by a lamination of thin films whose lamination direction is vertical to the surface of the magnetic disk 28 as indicated by the arrows in FIG. 6B. Since this head chip 4a has the low magnetic resistance path including the pole 43, the coil 48 and the terminals 41 and 42, but has no lead pattern, it can be made considerably small as has been explained with reference to FIG. 5. This head chip 4a can therefore be made 1/20 of the size of the one described in U.S. Pat. No. 5,111,351.

The flexible support 4b for supporting this head chip 4a is formed as follows. As shown in FIG. 7, an insulating layer 4-2 of an insulating resin is provided on a flexible metal plate 4-1 of stainless or the like. Lead patterns 4-3 and 4-4 of a conductive metal material, such as copper, are formed on this insulating layer 4-2. Formed on the lead patterns 4-3 and 4-4 is an insulating protection layer 4-5 which has holes formed to expose both end portions of each of the lead patterns 4-3 and 4-4.

Bump portions 4-6 and 4-7 of gold or the like are provided at the exposed portions of the lead patterns 4-3 and 4-4 at their one end (which are to be connected to the head chip 4a). It is a proximal end 4-10 of the flexible support 4b, a large area, which is to be connected to the associated arm 34 in order to increase the connection strength to the arm 34 (see FIG. 5 too).

To complete this magnetic head assembly, an insulating adhesive is applied around the bump portions 4-6 and 4-7 of the flexible support 4b in FIG. 7, and then the terminals 41 and 42 of the head chip 4a are positioned on the bump portions 4-6 and 4-7 of the flexible support 4b as shown in FIG. 8. Then, the terminals 41 and 42 of the head chip 4a are placed on the bump portions 4-6 and 4-7 and pressure is applied thereto. As the bump portions 4-6 and 4-7 of the flexible support 4b protrude, they contact with the terminals 41 and 42 of the head chip 4a, with the other portion of the head chip 4a secured to the flexible support 4b by the adhesive. The provision of the bump portions 4-6 and 4-7 on the flexible support 4b allows the small head chip 4a as wide as 0.5 mm to be electrically and securely connected to the flexible support 4b.

Lead wires 37 are connected to the arm-side ends of the lead patterns 4-3 and 4-4 of the flexible support 4b, thus completing the magnetic head assembly.

Then, an adhesive is applied to the large proximal end 4-10 of the protection layer 4-5 of the flexible support 4b, and the arm 34 is securely attached to this proximal end 4-10. The lead wires 37 are connected to the flat cable 36 mentioned above with reference to FIGS. 1 and 2.

Only the head chip 4a having the low magnetic resistance path including the pole, the coil and the terminals are formed on a wafer. The lead pattern portions are formed separately, not on the wafer. Conventionally, the lead pattern portions of the flexible magnetic head are formed integrally on the wafer. Accordingly, the number of the head chips 4a to be formed on a single wafer increases to about more than ten times the number conventionally available. Therefore, the magnetic head assembles can be provided at a low cost, and magnetic disk apparatuses of the vertical magnetic recording type can also be provided at a low cost.

Figure 9:
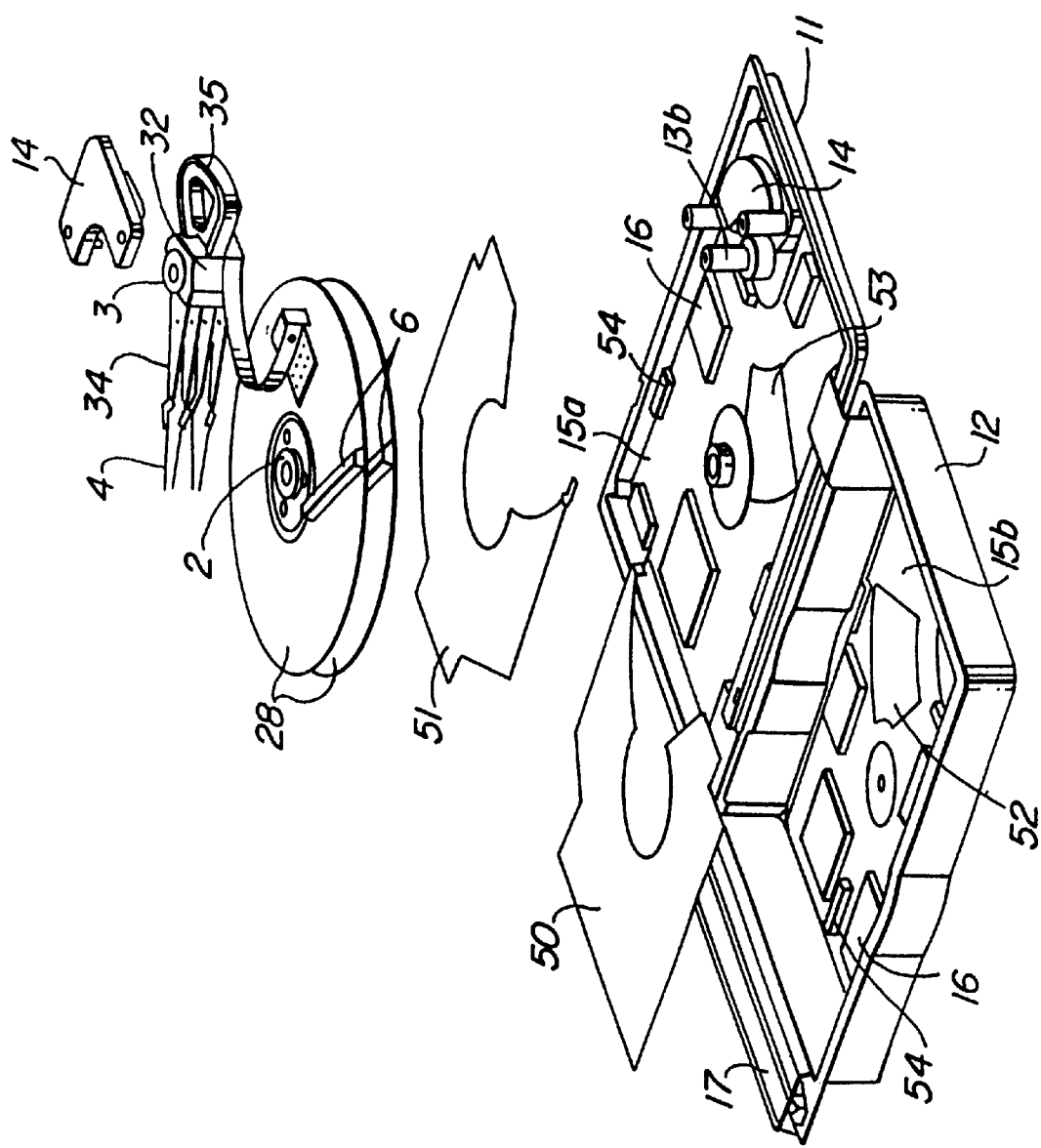
FIG. 9 is an exploded perspective view of the magnetic disk apparatus shown in FIG. 1.
Figure 10:
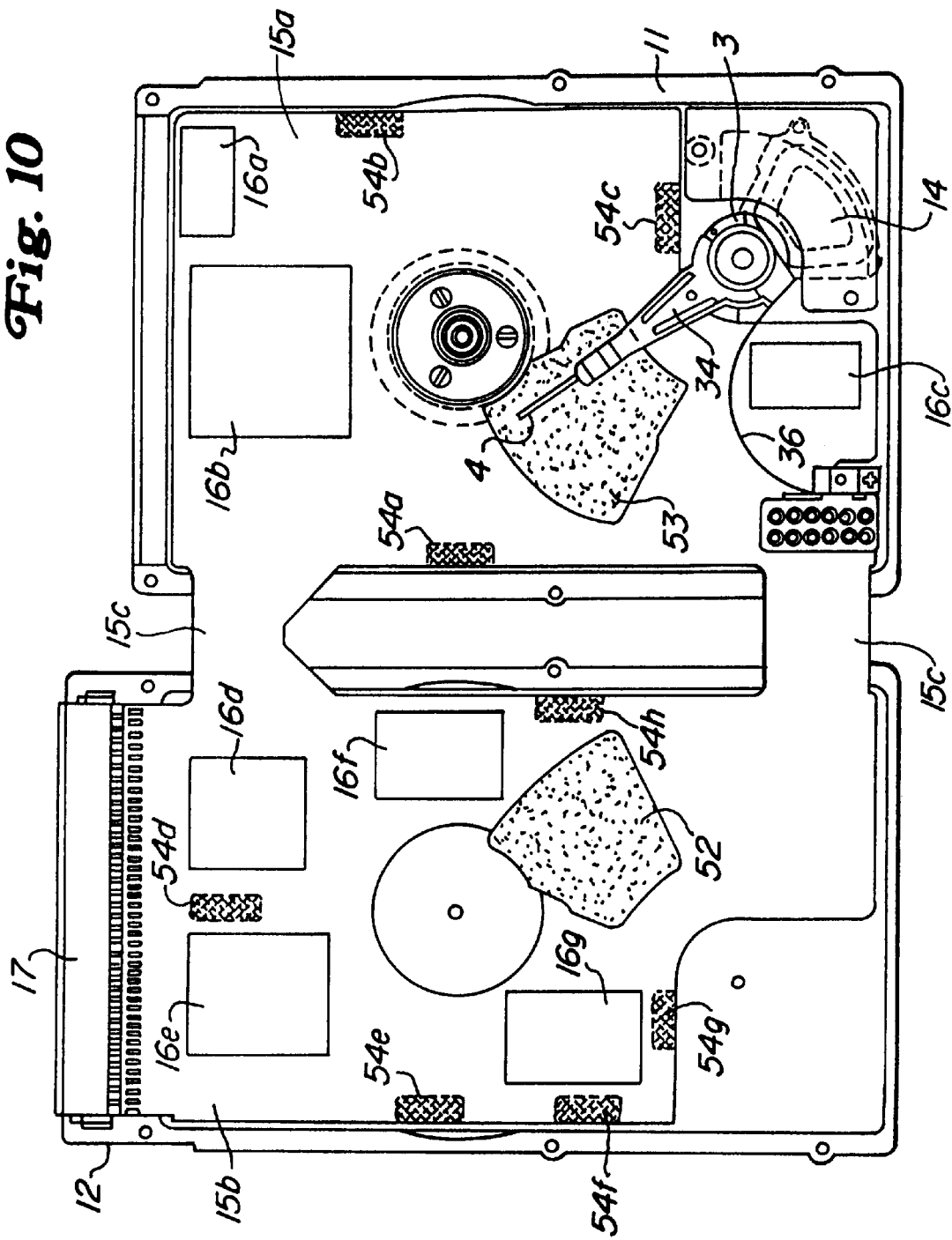
FIG. 10 is a diagram for explaining a printed circuit board of the magnetic disk apparatus.
Figure 11:
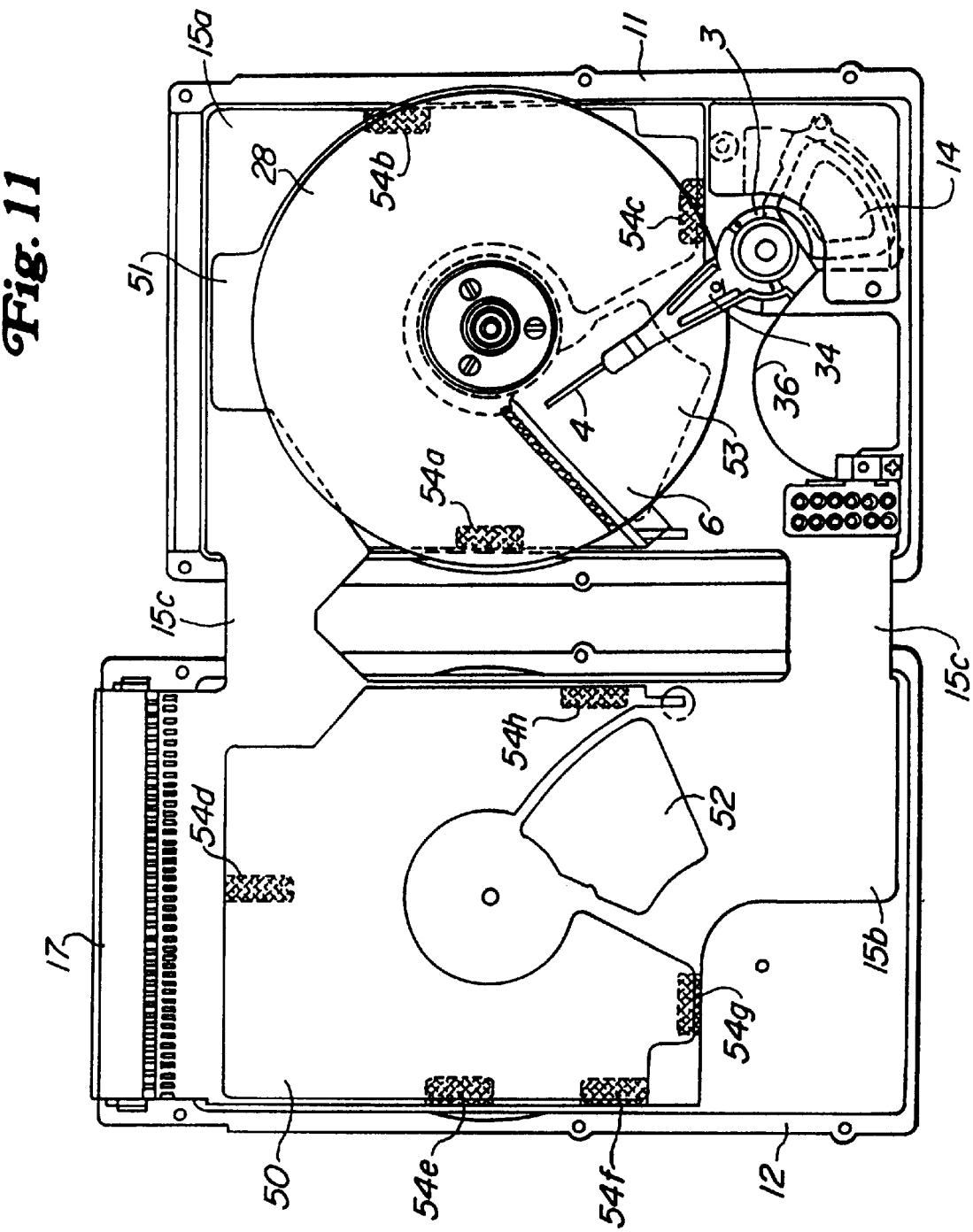
FIG. 11 is a top view of the magnetic disk apparatus with the top removed.
Figure 12:
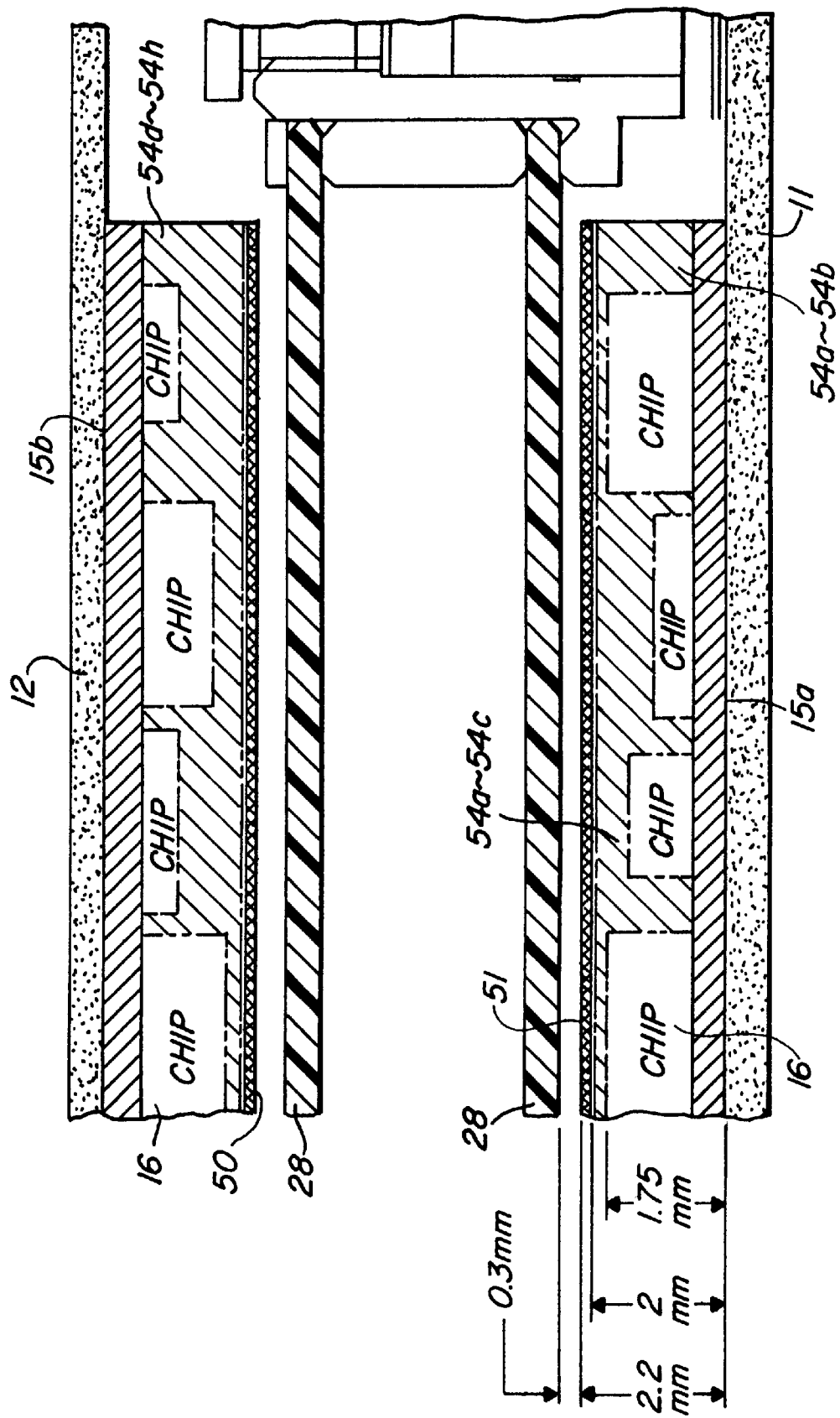
FIG. 12 is a cross-sectional view showing the essential portions of the magnetic disk apparatus.
Figure 13:
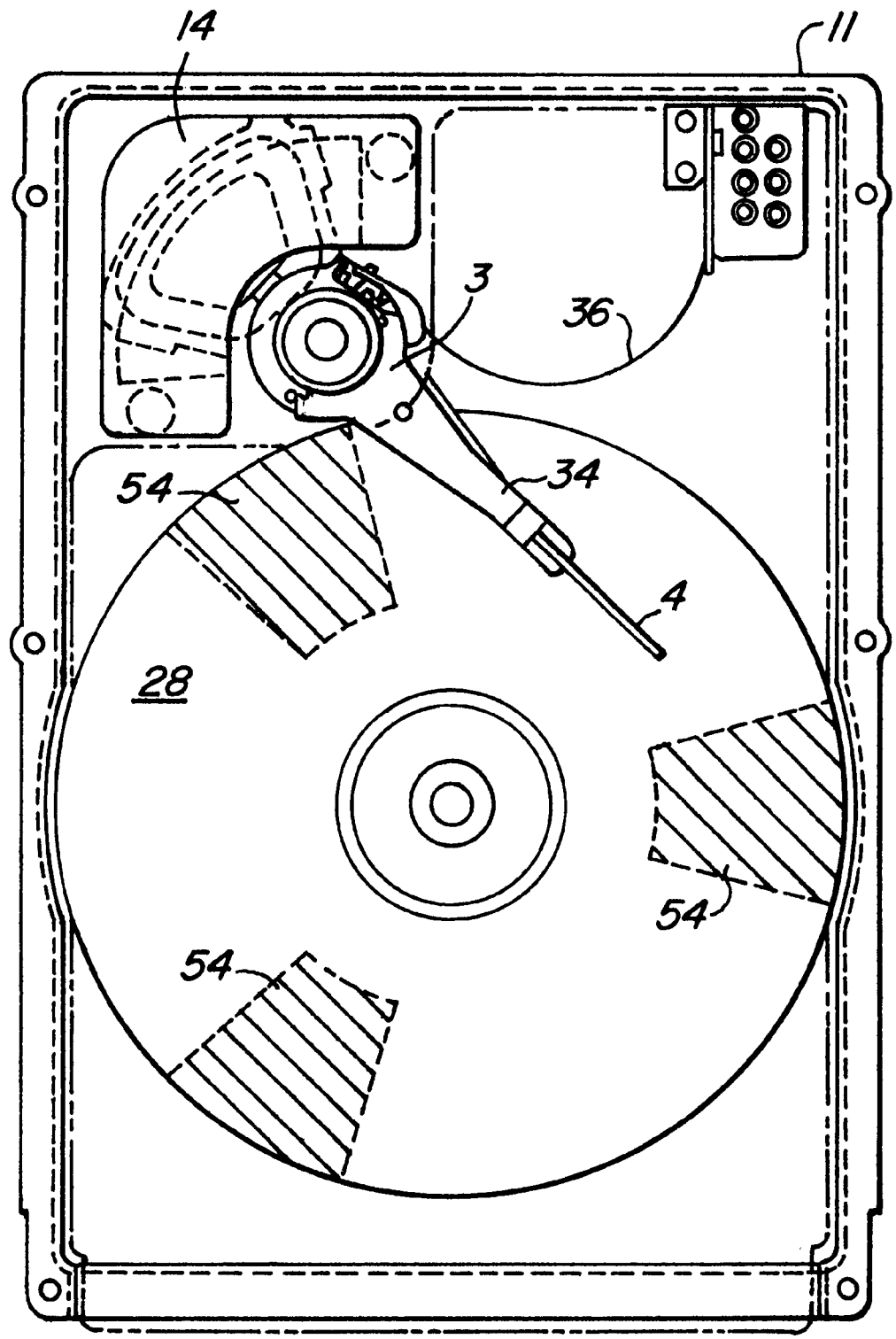
FIG. 13 is a diagram for explaining where shock absorbers of the magnetic disk apparatus are arranged.
Figure 14:
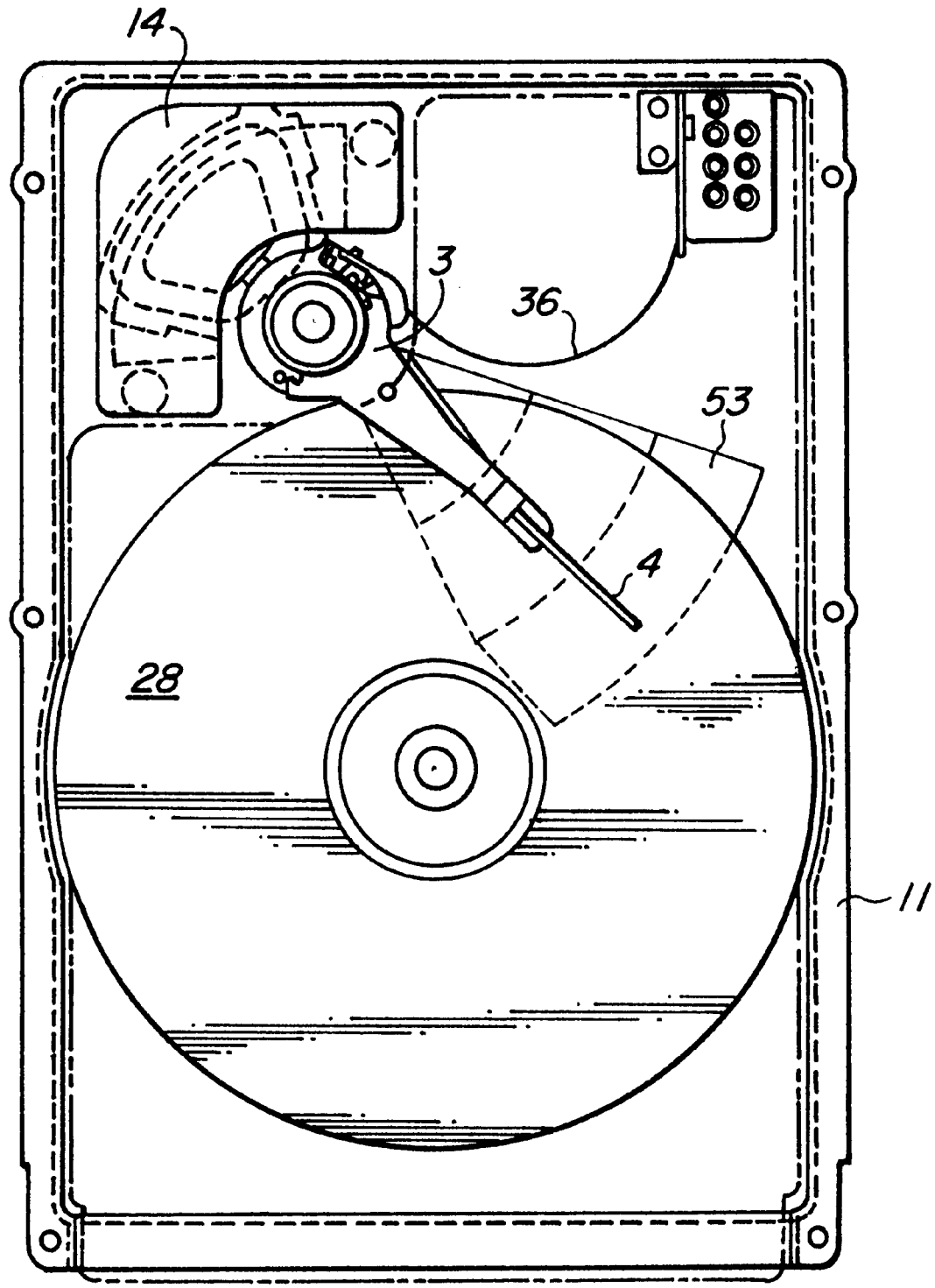
FIG. 14 is a diagram for explaining where a ferromagnetic member of the magnetic disk apparatus is arranged.

FIG. 9 is an exploded perspective view of the magnetic disk apparatus shown in FIG. 1. FIG. 10 illustrates how the printed circuit boards of the magnetic disk apparatus in FIG. 9 are mounted. FIG. 11 is a top view of the magnetic disk apparatus. FIG. 12 is a cross-sectional view showing the essential portions of the magnetic disk apparatus in FIG. 9. FIG. 13 is a diagram for explaining where shock absorbers of the magnetic disk apparatus are arranged. FIG. 14 is a diagram for explaining where a ferromagnetic member of the magnetic disk apparatus in FIG. 9 is arranged.

In FIGS. 9 and 10, the base 11 and the cover 12 are prepared by press working of a ferromagnetic body, and the printed circuit boards 15a and 15b are connected to each other by the link portions 15c as shown in FIG. 10. As shown in FIG. 10, the printed circuit board 15a provided on the base 11 has a shape with those portions cut out where the spindle motor 2, the magnetic circuit 14, the actuator 3 and ferromagnetic members 52 and 53 (which will be described later) are to be provided. Likewise, the printed circuit board 15b provided on the cover 12 has a shape with those portions cut out where the spindle motor 2, the magnetic circuit 14 and the actuator 3 are to be provided. The printed circuit boards 15a and 15b are formed integral with the link portions 15c connecting both printed circuit boards. Both printed circuit boards 15a and 15b are electrically connected together by an electric circuit patterns of the link portions 15c.

The printed circuit board 15a on the base 11 includes a read/write controller (LSI) 16a, a servo controller (LSI) 16b for controlling the spindle motor 2 and the actuator 3, and a data modulator/demodulator (LSI) 16c which performs modulation and demodulation on read data and write data, both controllers being an analog system. The printed circuit board 15b on the cover 12 includes a microprocessor 16d, an interface controller 16e, a ROM 16b and a RAM 16g, both controllers being of a digital system.

The above circuit arrangements are made because the spindle motor 2, the actuator 3 and the magnetic heads 4, which are controlled by analog signals, are attached to the base 11. The analog controllers are provided on the printed circuit board 15a on the base side to shorten the signal paths for analog signals.

The shock absorbers 54 for absorbing a shock on the magnetic disks 28, which originate from the vibration of the magnetic disks 28 caused by an external shock applied thereto, are provided on the printed circuit boards 15a and 15b. The shock absorbers 54 are formed of an elastic member having viscosity. For example, fluorocarbon rubber, butyl rubber and materials having similar properties are preferable while silicone rubber having no viscosity is not preferable.

The shock absorbers 54 are provided on those portions of the printed circuit boards 15a and 15b where the LSIs 16 and wiring patterns are not located. For instance, three shock absorbers 54a, 54b and 54c are provided on the printed circuit board 15a around the spindle motor as shown in FIG. 11, while six shock absorbers 54d, 54e, 54f, 54g and 54h are provided on the printed circuit board 15b around the spindle motor portion.

The shock absorbers 54 should be taller than the maximum height of the LSIs 16 mounted on the printed circuit boards 15a and 15b. In this example, the shock absorbers 54 are made taller than the LSIs 16 by 0.25 mm, as shown in FIG. 12.

The connector 17 is connected to one end portion of the printed circuit board 15b. The integral body of the printed circuit boards 15a, 15b and 15c is attached to the base 11 and the cover 12 as shown in FIG. 10. Specifically the printed circuit board 15a is attached to the bottom of the base 11 and the printed circuit board 15b to the bottom of the cover 12 by an adhesive or suitable substitute. Then, the ferromagnetic members 52 and 53 are provided in those of the base 11 and cover 12 where the magnetic heads 4 are movable. The reason for the provision of the ferromagnetic members 52 and 53 will be given later.

The shield members 50 and 51 are provided on the printed circuit boards 15a and 15b or the shock absorbers 54. The shield members 50 and 51 are formed of a metal plate of copper or similar material having good conductivity, and are about 0.2 mm thick. Those shield members 50 and 51 serve to shield the magnetic heads 4 from electric noise generated from the LSIs 16 and the wiring patterns. In this respect, the shield members 50 and 51 are shaped to cover the LSIs 16, which may cause noise, as shown in FIGS. 9 and 11.

As shown in FIG. 11, the actuator 3, on which the magnetic heads 4 are mounted, is attached to the base 11. Then, the spindle motor 2 on which the magnetic disks 28 are mounted is attached to the base 11. Then, the magnetic circuit 14 is attached, followed by the attachment of the dust shield member 6. The flat cable 36 of the actuator 4 is securely and electrically connected to the printed circuit board 15a, thus permitting the actuator 3 and spindle motor 2 to be electrically connected to the printed circuit board 15a.

Folding the resultant structure at the link portions 15c of the printed circuit board assembly, the cover 12 is placed over the base 11 and is secured to the base 11 by screws or the like, thus completing the assembly of the magnetic disk apparatus.

The described magnetic disk apparatus has the printed circuit boards 15a and 15b attached to the inner wall of the ferromagnetic housing (base 11 and cover 12) as slim as about 0.5 mm as shown in FIG. 12. The controller LSIs 16 are mounted on the printed circuit boards 15a and 15b. The height of the printed circuit boards plus the height of the LSIs is about 1.75 mm.

The shock absorbers 54a to 54h provided on the printed circuit board 15a and 15b have a height of about 2.0 mm from the inner wall of the housing, about 0.25 mm taller than the LSIs. The electric shield members 50 and 51 are about 0.2 mm thick and are provided on the shock absorbers 54a–54h. The distance from the electric shield members 50 and 51 to the magnetic disks 28 is about 0.3 mm.

The function of the shock absorbers 54 will now be described. The aforementioned detachable type magnetic disk apparatus may be dropped on a floor or subject to similar forces by accident. In this case of being dropped, the magnetic disk apparatus would likely receive an external shock of more than 300 G. The distance between the magnetic disks 28 and the housing is about 2.0 mm. Without the shock absorbers 54, therefore, when an external shock of such a magnitude is applied to the magnetic disk apparatus, the magnetic disks 28 vibrate so that the displacement of the magnetic disks 28 at their outermost peripheral portions become large. As a result, the magnetic disks 28 are likely to hit against the housing and may be damaged as a result.

If the circuitry portions, such as the LSIs, are providing in the housing, the distance between the magnetic disks 28 and the circuitry portions becomes smaller, thus increasing the possibility of damaging the magnetic disks 28 if the disks hit the circuitry portions. Further, the internal circuits may also be damaged.

As a solution to this problem, the shock absorbers 54 are provided in the housing to suppress the vibration of the magnetic disks 28 and prevent the magnetic disks 28 from hitting against the housing. At this time, the shock absorbers 54 need viscosity in addition to elasticity as their characteristics. If the shock absorbers 54 merely have elasticity, repulsive force would be generated, preventing the shock absorbers 54 from absorbing the vibration of the magnetic disks 28. Shock absorbers 54 having viscosity can absorb the force of the vibration of the magnetic disks 28 and can thus suppress the displacement of the magnetic disks 28.

In this case, if the circuits are provided in the housing, the shock absorbers 54 should be designed taller than the circuitry portions. This is because that if the magnetic disks 28 come in contact with the circuitry portions before contacting the shock absorbers 54 due to some applied external shock, the magnetic disks 28 may collide hard with the circuitry portions and would be damaged. Thus, the provision of the shock absorbers 54 would become insignificant.

As the displacement of each magnetic disk 28 becomes largest at its outermost peripheral portion, it is desirable to provide the shock absorbers 54 in the vicinity of the outermost peripheral portion of the magnetic disks 28, as shown in FIG. 13.

In consideration of an external shock applied from all the directions, it is desirable to provide the shock absorbers 54 at three or more positions of different directions around the spindle motor 2 with respect to the magnetic disks 28, as shown in FIG. 13. In this respect, the three shock absorbers 54a, 54b and 54c are provided at three positions of different directions on the base side 11 in the example shown in FIGS. 10 and 11. The three shock absorbers 54d, 54e and 54h are provided at three directionally different positions around the spindle motor 2 on the cover side 12. The shock absorbers 54f and 54g are additionally provided to support the electric shield member 50 at its end portion and to absorb shock.

The housing (base 11 and cover 12) is made of a ferromagnetic material to protect the recording magnetization of the magnetic disks 28 and the recording/reproducing actions of the magnetic heads 4 from the aforementioned external magnetic field. The external magnetic field magnetizes the head portion of each magnetic head 4, causing a data error at the time of data recording/reproduction. The ferromagnetic member 53 for shielding an external magnetic field is provided generally in the movable range of the magnetic heads 4, as shown in FIG. 14.

In the vertical recording system, the direction of magnetization of the magnetic disks 28 is in the thickness direction of the magnetic disks 28. Further, the magnetic disk apparatus is slim in the thickness direction of the magnetic disks 28, so that the direction of magnetization of the magnetic disks 28 may be changed by an external magnetic field. It is therefore desirable to magnetically shield the magnetic disks 28 as well. Thus, the housing itself is made of a ferromagnetic material.

This ferromagnetic material is heavier than aluminum. As a result, increasing the thickness of the housing to improve the shielding effect increases the weight of the magnetic disk apparatus itself and is therefore not desirable. Accordingly, the housing made of a ferromagnetic material is made just thick enough (e.g., about 0.5 mm) to eliminate the influence of the external magnetic field on the magnetic disks 28. Further the ferromagnetic members 52 and 53 are further provided only to those portions of the magnetic heads 4 which are likely to be affected by the external magnetic field. Thus sufficient magnetic field shielding effect can be provided without making the magnetic disk apparatus unnecessarily heavier.

The electric shield members 50 and 51 are provided on the LSIs 16 of the printed circuit boards 15a and 15b for the following reason. Electric noise may be generated from the terminals of the LSIs 16 and the wiring patterns of the printed circuit boards 15a and 15b. This noise may affect he recording/reproducing function of the magnetic heads 4, causing a data error. Particularly, as the signal frequency becomes higher, as with recent improvements of the recording density, noise is likely to occur.

For this reason, the electric shield members 50 and 51 are provided on the LSIs 16 of the printed circuit boards 15a and 15b to shield the magnetic heads 4 from possible electric noise generated from the LSIs 16, etc.

In this case, the aforementioned external shock on the magnetic disks 28 will be absorbed by the shock absorbers 54 through the electric shield members 50 and 51. The magnetic disks 28 could hit against the shield members 50 and 51 of metal, and could be damaged by the metal-to-metal collision. Thus layers of resin, such as polyimide, are preferably provided on the sides of the copper shield members 50 and 51 where the magnetic disks 28 are located. The resin layers are provided to prevent scratches from being made on the magnetic disks 28 during a collision, using the elasticity of the polyimide resin layer.

It is desirable to also provide polyimide resin layers on those sides of the shield members 50 and 51 where the printed circuit boards 15a and 15b are located. This is because the electric shield members 50 and 51 may directly contact the printed circuit boards 15a and 15b at the portions where the shock absorbers 54 or the LSIs 16 are not provided. The insulating polyimide resin layer, if provided on the printed circuit board sides of the shield members 50 and 51, can prevent the contact of the shield members 50 and 51 with the printed circuit boards 15a and thus prevent affects to the circuitry. In addition, since those resin layers cover the electric shield members 50 and 51 made of copper, they also serve to prevent rustable copper from being rusted.

The provision of the shock absorbers in the housing in the above-described manner can suppress the external-shock originated displacement of the magnetic disks 28, thus preventing the magnetic disks 28 from being damaged by the external shock. If the housing (base 11 and cover 12) is made of a ferromagnetic material, the magnetic disks 28 and the magnetic heads 4 can also be protected from an external magnetic field. The increase in the weight of the magnetic disk apparatus can be minimized by minimizing the thickness of the ferromagnetic material for the housing and providing additional ferromagnetic members 52 and 53 to shield the magnetic heads 4 which are most easily attached by the external magnetic field.

Further, since the controllers-mounted printed circuit boards are placed in the housing, the magnetic disk apparatus including the printed circuit boards can be made shorter. Although the printed circuit boards are placed in the housing, the provision of the electric shield members 50 and 51 can protect the magnetic heads 4 from electric noise generated from the printed circuit boards.

Furthermore, since the shock absorbers 54 are made of a material having both viscosity and elasticity, the vibration of the magnetic disks 28 can be reduced by the elasticity and can be absorbed by the viscosity. Since shock absorbers 54 are provided in the vicinity of the outermost peripheral portion of the magnetic disks 28, where the vibration displacement is the largest, the vibration of the magnetic disks 28 can be suppressed while it is still small. In addition, since the shock absorbers 54 are provided at a plurality of positions near the outermost peripheral portion of the magnetic disks 28, the vibration of the magnetic disks 28 in any circumferential direction can be suppressed.

Figure 15:
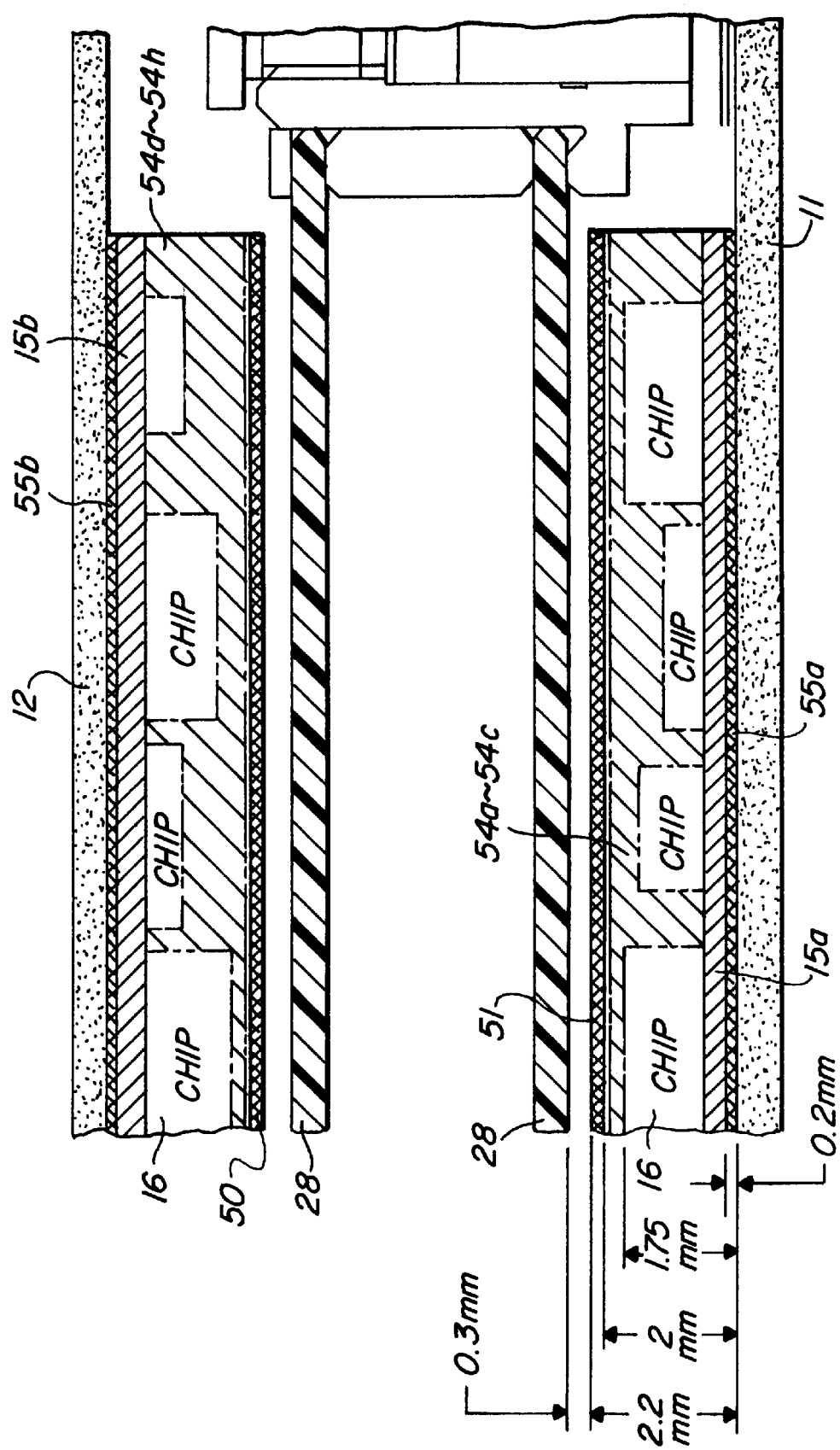
FIG. 15 is a cross-sectional view showing the essential portions of a modification of the magnetic disk apparatus of this invention.

Modifications of this invention will now be described. FIG. 15 is a cross-sectional view showing the essential portions of a modification of the magnetic disk apparatus of this invention. FIG. 15 presents a cross section of the magnetic disk apparatus at the same position as in FIG. 12. This modification has the structure of the embodiment shown in FIG. 12 plus an electric-wave shield layer 55a provided between the base 11 and the printed circuit board 15a and an electric-wave shield layer 55b provided between the cover 12 and the printed circuit board 15b as shown in FIG. 15.

When a computer or the like incorporating a magnetic disk apparatus is placed near a television set or similar device having strong leak waves, the LSIs 16 on the printed circuit boards 15a and 15b in the magnetic disk apparatus may malfunction or the read/write performance of the magnetic heads 4 may be reduced due to the leak noise. This way cause a data error.

The penetration of the external electric wave noise into noise-susceptive components can be prevented by the electric-wave shield layers 55a and 55b. A preferable material for the electric-wave shield layers 55a and 55b is metal having good conductivity, such as copper. If insulating layers are provided at least on those surfaces of the electric-wave shield layers 55a and 55b where the printed circuit boards 15a and 15b are located, the pins of the LSIs mounted on the printed circuit boards 15a and 15b will not be short-circuited. Such an insulating layer may also be provided on the base side (11) or the cover side (12) of each of the electric-wave shield layers 55a and 55b to prevent the material for those electric-wave shield layers, e.g. copper or other sulfide material, from being easily rusted.

If electric-wave shield layers, such as copper-plated layers, are provided on the magnetic head sides (4) of the ferromagnetic members 52 and 53 provided in the movable range of the magnetic heads 4, which have been described referring to FIGS. 9 and 14, the magnetic heads 4 can also be protected from external electric wave noise.

Figure 16:
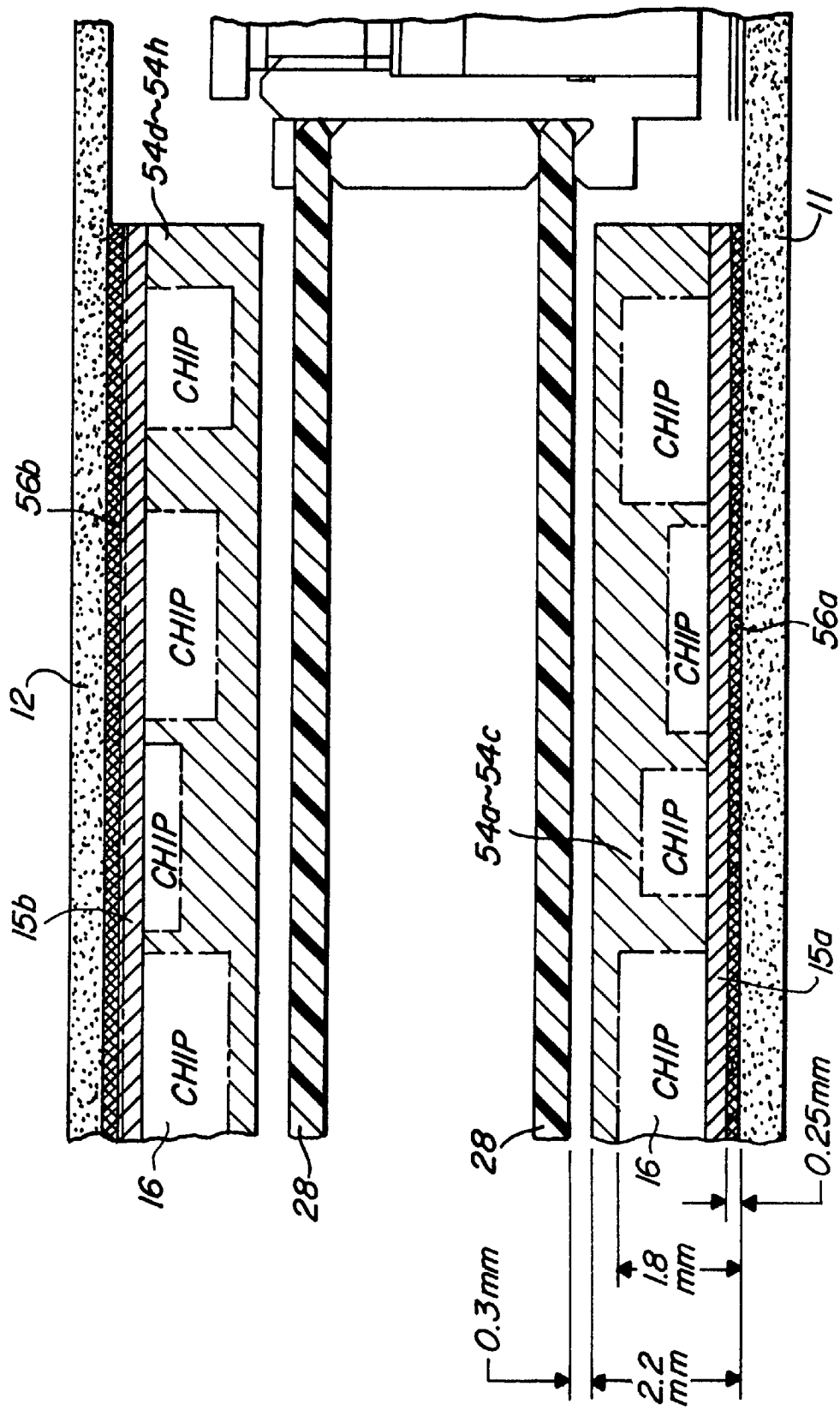
FIG. 16 is a cross-sectional view showing the essential portions of another modification of the magnetic disk apparatus of this invention.

FIG. 16 is a cross-sectional view showing the essential portions of another modification of the magnetic disk apparatus of this invention. According to this modification, the base 11 and cover 12 in the magnetic disk apparatus of the embodiment shown in FIG. 12 are made of non-magnetic metal, such as aluminum. The use of aluminum for the housing, comprising the base 11 and cover 12, contributes to facilitating the manufacturing of the base 11 and the cover 12 due to its easy processing. It also aids in making the magnetic disk apparatus lighter.

In this modification, a ferromagnetic member 56a of iron, Permalloy or the like, about 0.25 mm thick, is arranged on the base 11, with the printed circuit board 15a provided on the member 56a. Likewise, another ferromagnetic member 56b of iron, Permalloy or the like, about 0.25 mm thick, is arranged on the cover 12, with the printed circuit board 15b provided on the member 56b. Like the embodiment shown in FIG. 12, this modification can provide magnetic shielding against external magnetic fields. In this example, the shock absorbers 54 are also provided on the printed circuit boards 15a and 15b to improve the shock resistance.

Further, if electric-wave shield layers, such as copper-plated layers are provided on the ferromagnetic members 56a and 56b, external electric waves can be shielded.

If the ferromagnetic members 56 are provided in the movable range of the magnetic heads 4, it is possible to magnetically shield the magnetic heads 4. In this case, it is desirable if the ferromagnetic members 56 provided in the movable range of the magnetic heads 4 be made thicker than the ferromagnetic members 56a and 56b provided under the printed circuit boards.

Figure 17:
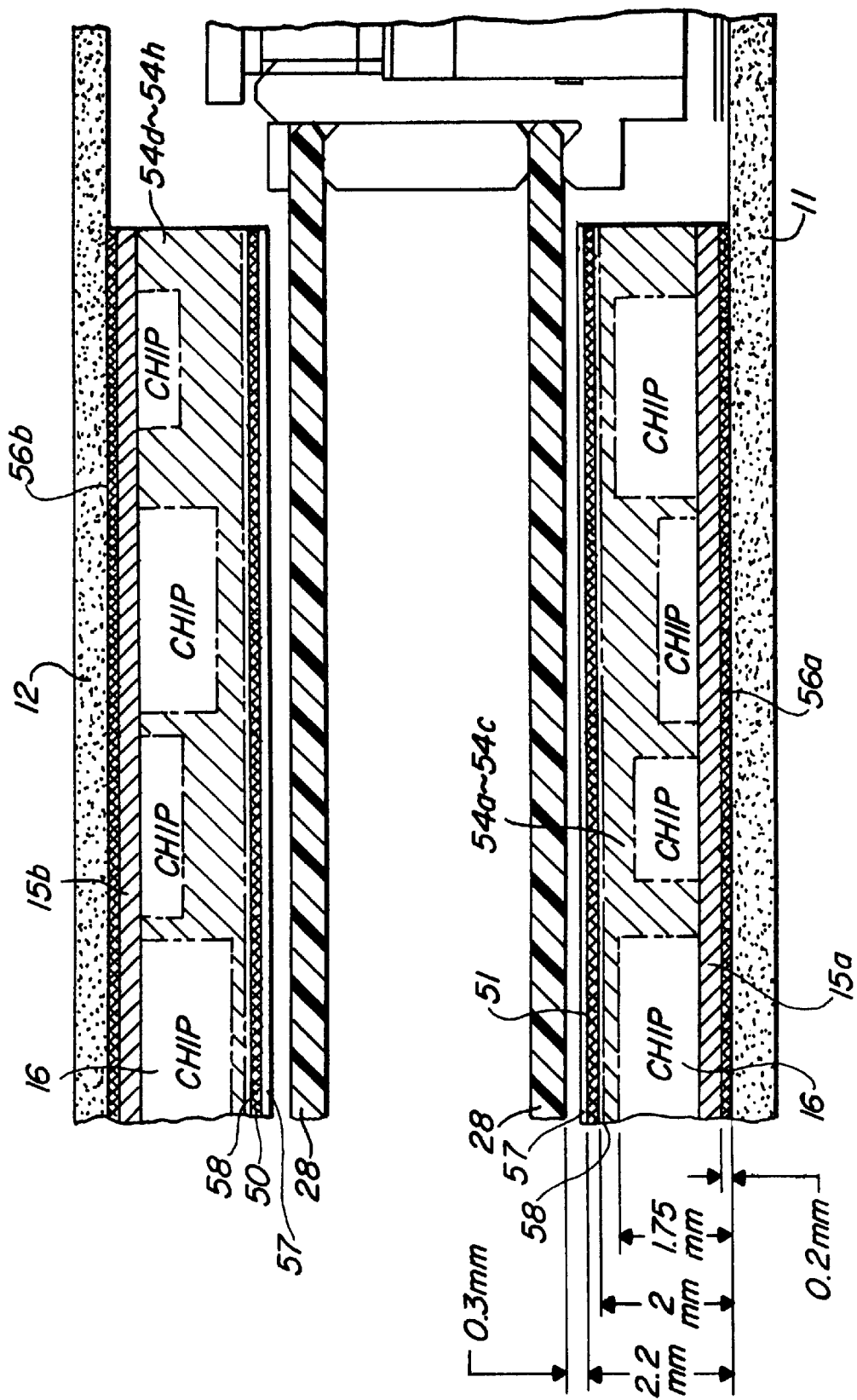
FIG. 17 is a cross-sectional view showing the essential portions of a further modification of the magnetic disk apparatus of this invention.

FIG. 17 is a cross-sectional view showing the essential portions of a further modification of the magnetic disk apparatus of this invention. This modification has the structure of the modification in FIG. 16 plus electric shield members 50 and 51 provided on the LSIs 16 on the printed circuit boards 15a and 15b. Thus shielding the magnetic heads 4 are shielded from electric noise generated from the LSIs 16.

In this case, like in the example of FIG. 16, layers of resin, such as polyimide resin layers 57, are provided on the magnetic disk sides of the copper shield members 50 and 51 to cope with an external shock. The direct collision of the magnetic disks 28 with the shield members 50 and 51 is prevented to prevent scratches from being made on the magnetic disks 28 through the elasticity of the polyimide resin layer.

It is desirable to also provide polyimide resin layers 58 on those sides of the shield members 50 and 51 where the printed circuit boards 15a and 15b are located. This is because the electric shield members 50 and 51 may directly contact the printed circuit boards 15a and 15b at the portions where the shock absorbers 54 or the LSIs 16 are not provided. The insulating polyimide resin layer, if provided on the printed circuit board sides of the shield members 50 and 51, can prevent the contact of the shield members 50 and 51 with the printed circuit boards 15a and 15b from affecting the circuitry. In addition, as those resin layers cover the electric shield members 50 and 51 made of copper, they also serve to inhibit rust formation. In this example, the shock absorbers 54 are also provided on the printed circuit boards 15a and 15b to improve the shock resistance.

FIG. 18A is a structural diagram of a still another modification of the magnetic disk apparatus of this invention, showing the outline of the magnetic disk apparatus. In this modification, instead of providing the shock absorbers 54 in the housing 11, 12, as in the embodiment shown in FIG. 12, shock absorbers 54-1 are provided on the outer surfaces of the housing 11, 12. As shown in the cross-sectional view of FIG. 18B, a recess 11-1 is provided in the side surface of the base 11 and one shock absorber 54-1 is placed therein. Likewise, a recess 12-1 is provided in the side surface of the cover 12 and another shock absorber 54-1 is placed therein. It is desirable to make the shock absorbers 54-1 with a viscous and elastic material as in the embodiment in FIG. 12. A suitable material is fluorocarbon rubber.

With the above structure, when the magnetic disk apparatus is dropped on a floor or subject to similar handling, a shock applied in entirety to the sides of the magnetic disk apparatus can be reduced. It is therefore possible to suppress the displacement of the magnetic disks due to a shock applied from the sides of the apparatus, thus protecting the magnetic disks 28 and magnetic heads 4 from damaged.

FIG. 19A is structural diagram of a still another modification of the magnetic disk apparatus of this invention, showing the exterior of the apparatus. This modification is the modification shown in FIGS. 18A and 18B, with the shock absorbers 54-1 provided on both the upper and lower end portions of the base 11 and cover 12 as shown in the cross-sectional view of FIG. 19B. More specifically, a recess 11-1 is provided in the side surface of the base 11 and one shock absorber 54-1 is provided between both end portions of the base 11. Similarly, a recess 12-1 is provided in the side surface of the cover 12 and another shock absorber 54-1 is placed between both end portions of the cover 12. It is desirable to make the shock absorbers 54-1 from a viscous and elastic material as in the embodiment in FIG. 1. A suitable material is fluorocarbon rubber.

With the above structure, when the magnetic disk apparatus is dropped on a floor or the like, a shock applied in entirety to the sides of the magnetic disk apparatus can be reduced. It is therefore possible to suppress the displacement of the magnetic disks due to a shock applied from the sides of the apparatus, thus protection the magnetic disks 28 and magnetic heads 4 from damage. It is also possible to protect the spindle motor or the like from damage by a shock applied from the top and bottom directions in the diagram.

Since the shock absorbers 54-1 are provided in the recesses 11-1 and 12-1 formed in the sides of the housing 11, 12, the magnetic disk apparatus need not be made significantly taller even through the shock absorbers 54 are actually provided on the outer surfaces of the housing 11, 12.

Figure 20:
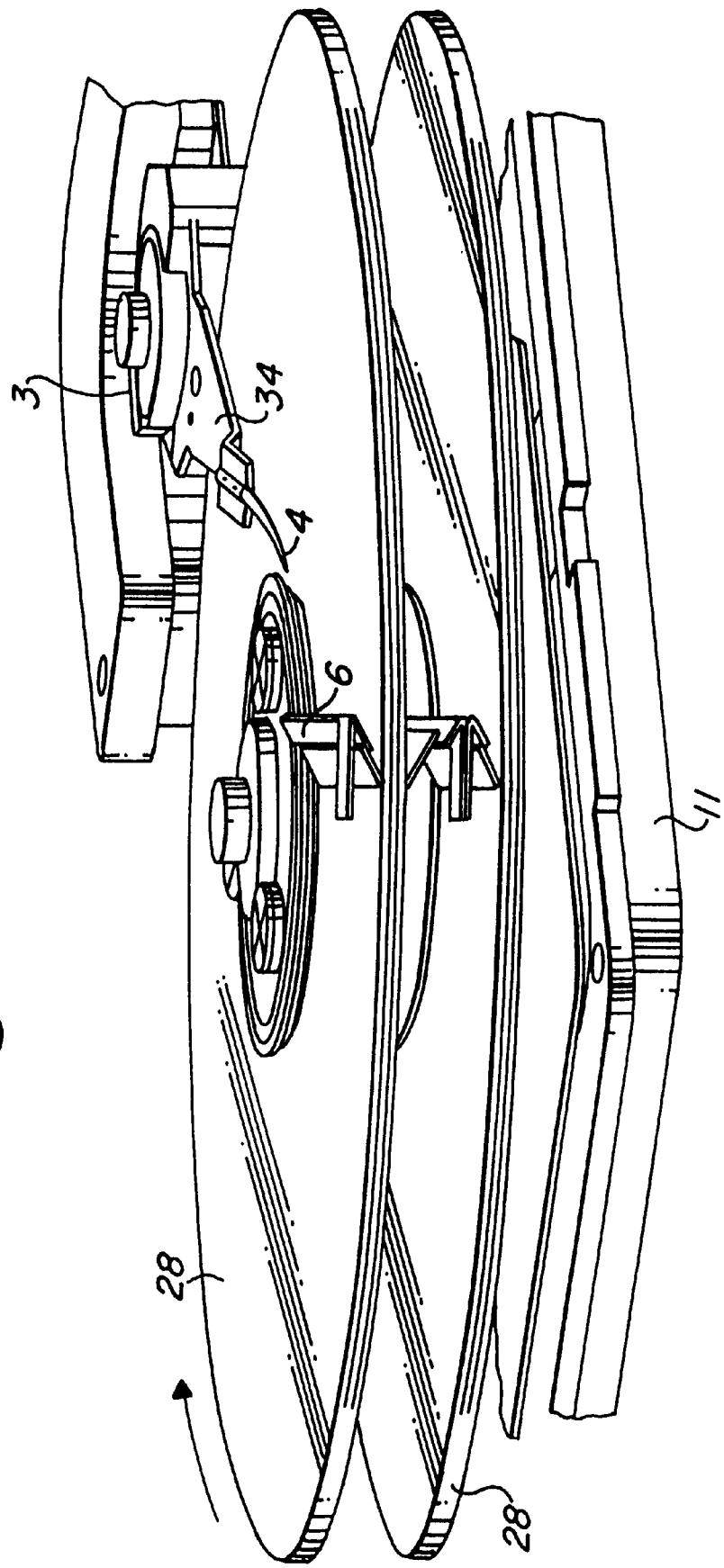
FIG. 20 is a perspective view showing the essential portions of a yet still further modification of the magnetic disk apparatus of this invention.
Figure 21:
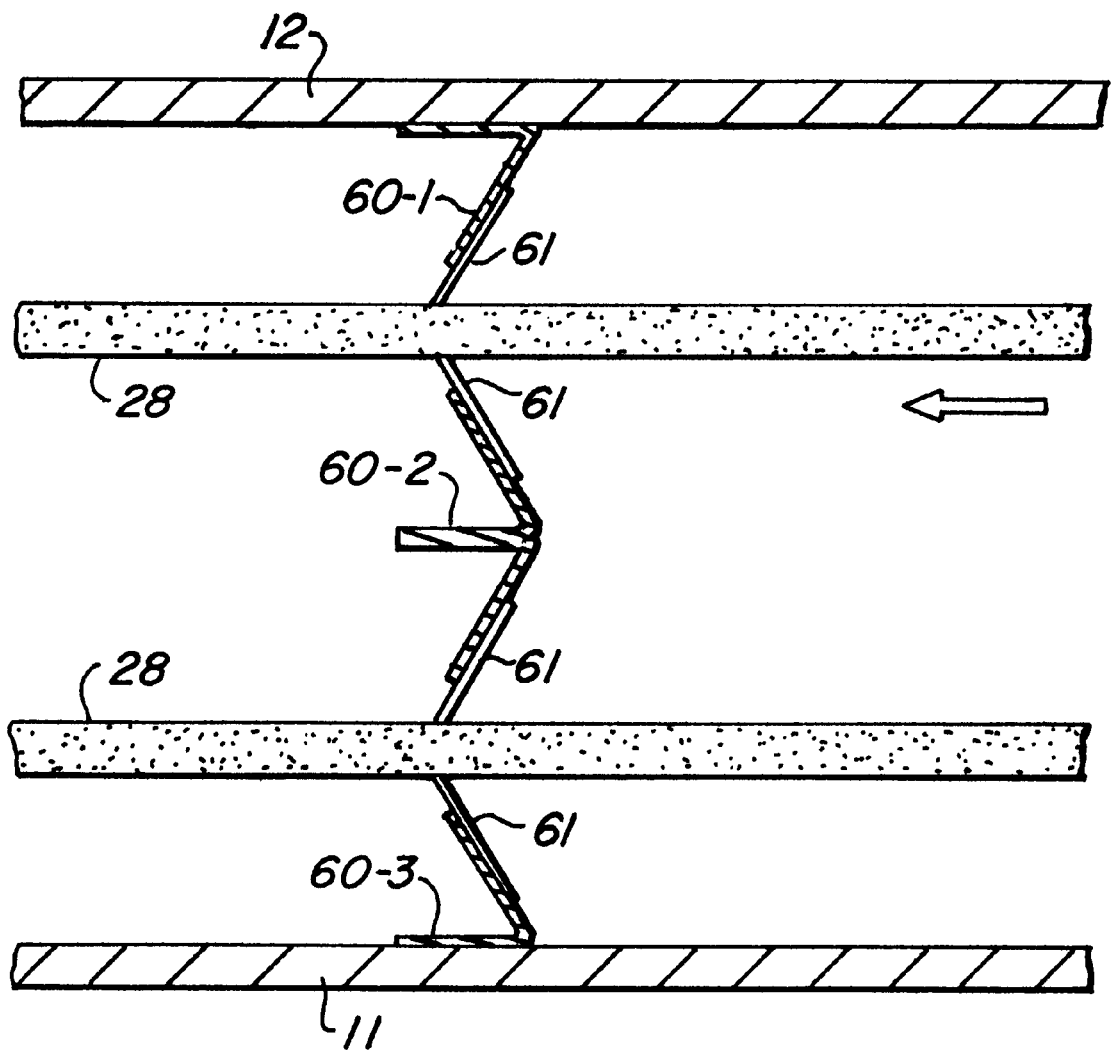
FIG. 21 is a cross-sectional view showing the essential portions of the magnetic disk apparatus in FIG. 20.

FIG. 20 is perspective view for explaining a yet another modification of the magnetic disk apparatus of this invention. FIG. 21 is a cross-sectional view of the magnetic disk apparatus in FIG. 20. With the use of a contact recording system in which the magnetic heads 4 contact the magnetic disks 28, as described earlier, wear-out powder is produced between the magnetic head 4 and the associated magnetic disk 28. As the magnetic disk 28 rotates, this wear-out powder returns to the magnetic head 4 and comes between that magnetic head 4 and the associated magnetic disk 28. This can reduce the recording/reproducing characteristics of the magnetic heads 4, any can cause a data error.

It is therefore desirable to remove dust, such as wear-out powder, from the surfaces of the magnetic disks 28. For this reason, a dust shield member 6 is provided for the surface of each magnetic disk 28. The dust shield members 6 are provided as follows. As shown in FIG. 21, attaching portions 60-1 and 60-3 are provided on the cover 12 and the base 11, respectively, with another attaching portion 60-2 provided between the magnetic disks 28. The dust shield members 61 are provided on the attaching portions 60-1 to 60-3. It is desirable that the dust shield members 61 are made of a soft material, such as dust-free paper or dust-free cloth "kimwipe," a product name, is a suitable material.

This dust shield member 61 should partially or entirely contact the surface of the associated magnetic disk 28, thereby cleaning dust off the disk surface so that dust, such as wear-out powder will not remain on the disk surface.

Each dust shield member 61 is tilted at a given angle to the surface of the associated magnetic disk 28, as shown in FIGS. 20 and 21, so that it will not become a rotational load on the magnetic disk 28. Further, the dust shield member 61 is located at the back of the associated magnetic head 4 in the rotational direction of the magnetic disk 28 so the associated wear-out powder produced by that magnetic head 4 is wiped out immediately after behind the magnetic head 4.

In addition to the above-described embodiments and modifications, the present invention admits of various other modifications which would be apparent to one skilled in the art. First, although the foregoing description has been given with reference to the contact type magnetic heads, this invention may be applied to float type magnetic heads as well. Secondly, the shock absorbers 54 may be provided directly on the base 11 and the cover 12 if no controllers are to be installed inside the apparatus. Thirdly, if there is no need to shield an external magnetic field, the base 11 and the cover 12 may be made of a non-magnetic material and no ferromagnetic layers need to be provided. Fourthly, although the foregoing description has been given of the case where two magnetic disks are provided in the magnetic disk apparatus, the apparatus may comprise one magnetic disk or three or more magnetic disks. Fifthly, although the foregoing description has been given of the case of the vertical recording, this invention can also be applied to a horizontal magnetic recording system in which case the ferromagnetic members for shielding a magnetic field have only to be disposed in the movable range of the magnetic heads 4.

In short, according to this invention, as the shock absorbers are provided in the vicinity of the magnetic disks in the enclosure (housing) of the magnetic disk apparatus, a shock on the magnetic disks due to the external-shock originated vibration of the disks can be suppressed to prevent the magnetic disks from being damaged by the external shock. Further, there is empty space near the magnetic disks in the enclosure of the magnetic disk apparatus, the shock absorber can be provided without changing the height of the magnetic disk apparatus. This can contribute to making the magnetic disk apparatus compact.

What is claimed is:

1. A magnetic disk apparatus comprising:
    a magnetic disk, said magnetic disk defining a disk surface and an outer circumference thereof;
    rotation means for rotating said magnetic disk;
    a magnetic head for recording and reproducing information on and from said magnetic disk;
    an actuator for supporting said magnetic head and moving said magnetic head to a given position on said magnetic disk;
    an enclosure for covering said magnetic disk, magnetic head, rotation means and actuator, said enclosure comprising a base, to which said rotation means are attached, and a cover which attaches to said base to seal said enclosure;
    protection means provided in said enclosure for absorbing vibration of said magnetic disk and for preventing said disk from contacting said enclosure and components within said enclosure, said protection means consisting of a material having viscosity and elasticity and being positioned between said disk surface and said components within said enclosure at multiple distinct locations near the outer circumference of said magnetic disk such that said disk surface may directly contact said protection means after an external force has been applied to said magnetic disk apparatus, wherein said protection means spaced from said magnetic disk in a face to face relationship with said disk surface;
    a circuit board provided on an inner wall of the enclosure;
    circuitry for accomplishing magnetic recording and reproduction, the circuitry being mounted on the circuit board; and
    a conductive metal member provided on said protection means for covering the circuitry.

2. The magnetic disk apparatus according to claim 1, wherein the protection means are provided around the magnetic disk in the enclosure.

3. The magnetic disk apparatus according to claim 1, wherein the protection means are provided at a plurality of positions around the magnetic disk.

4. The magnetic disk apparatus according to claim 3, wherein the protection means are taller than the circuitry.

5. The magnetic disk apparatus according to claim 3, further comprising an elastic insulating layer provided on that surface of the conductive metal member which faces the magnetic disk.

6. The magnetic disk apparatus according to claim 1, wherein the protection means are taller than the circuitry.

7. The magnetic disk apparatus according to claim 1, further comprising an elastic insulating layer provided on that surface of the conductive metal member which faces the magnetic disk.

8. The apparatus of claim 1 wherein said protection means comprises a shock absorber.

9. The magnetic disk apparatus according to claim 1, wherein said protection means is spaced from said magnetic disk in said face to face relationship by a distance of between approximately 0.3 mm and approximately 0.5 mm.

10. A magnetic disk apparatus comprising:
    a magnetic disk, said magnetic disk defining a disk surface;
    rotation means for rotating said magnetic disk;
    a magnetic head for recording and reproducing information on and from said magnetic disk;
    an actuator for supporting said magnetic head and moving said magnetic head to a given position on said magnetic disk;
    an enclosure for covering said magnetic disk, magnetic head, rotation means and actuator, said enclosure comprising a base, to which said rotation means are attached, and a cover which attaches to said base to seal said enclosure;
    a circuit board provided on an inner wall of said enclosure:
    circuitry for accomplishing magnetic recording and reproduction mounted on said circuit board;
    protection means provided in said enclosure on said circuit board, said protection means for absorbing vibration of said magnetic disk and for preventing said disk from contacting said enclosure and components within said enclosure, said protection means being positioned between said disk surface and said components within said enclosure such that said disk surface may directly contact said protection means after an external force has been applied to said magnetic disk apparatus; said protection means being spaced from said magnetic disk in a face to face relationship with said disk surface and;
    a conductive metal member provided on said protection means for covering said circuitry.

11. The magnetic disk apparatus according to claim 10, further comprising an elastic insulating layer provided on that surface of the conductive metal member which faces the magnetic disk.

12. The magnetic disk apparatus according to claim 10, wherein the protection means are taller than the circuitry.

13. A magnetic disk apparatus comprising:
    a magnetic disk, said magnetic disk defining a disk surface and an outer circumference thereof;
    rotation means for rotating said magnetic disk;
    a magnetic head for recording and reproducing information on and from said disk surface;
    an actuator for supporting said magnetic head and moving said magnetic head to a given position on said disk surface;

an enclosure for covering said magnetic disk, magnetic head, rotation means and actuator, said enclosure comprising a base, to which said rotation means are attached, and a cover which attaches to said base to seal said enclosure;

protection means provided in said enclosure for absorbing vibration of said magnetic disk and for preventing said magnetic disk from contacting components existing in an area of a normal line direction of said disk surface when said magnetic disk is moved or vibrated in the normal line direction of said disk surface, said protection means consisting of a material having viscosity and elasticity and being positioned between said disk surface and said components within said enclosure at multiple distinct locations near the outer circumference of said magnetic disk such that said disk surface may directly contact said protection means after an external force has been applied to said magnetic disk apparatus, wherein said protection means is spaced from said magnetic disk in a face to face relationship with said disk surface;

a circuit board provided on an inner wall of the enclosure;

circuitry for accomplishing magnetic recording and reproduction, the circuitry being mounted on the circuit board; and a conductive metal member provided on said protection means for covering the circuitry.

14. The magnetic disk apparatus according to claim 13, wherein said protection means is spaced from said magnetic disk in said face to face relationship by a distance of between approximately 0.3 mm and approximately 0.5 mm.

15. A disk apparatus comprising:

a disk, said disk defining a disk surface and an outer circumference thereof;

rotation means for rotating said disk;

a head for recording and reproducing information on and from said disk;

an actuator for supporting said head and moving said head to a given position on said disk;

an enclosure for covering said disk head, rotation means and actuator, said enclosure comprising a base, to which said rotation means are attached, and a cover which attaches to said base to seal said enclosure;

protection means provided in said enclosure for absorbing vibration of said disk and for preventing said disk from contacting said enclosure and components within said enclosure, said protection leans consisting of a material having viscosity and elasticity and being positioned between said disk surface and said components within said enclosure at multiple distinct locations near the outer circumference of said disk such that said disk surface may directly contact said protection means after an external force has been applied to said disk apparatus, wherein said protection means is spaced from said disk in a face to face relationship with said disk surface; and a circuit board provided on an inner wall of the enclosure;

circuitry for accomplishing recording and reproduction, the circuitry being mounted on the circuit board; and a conductive metal member provided on said protection means for covering the circuitry.

* * * * *

UNITED STATES PATENT AND TRADEMARK OFFICE
CERTIFICATE OF CORRECTION

PATENT NO. : 6,002,546
DATED : December 14, 1999
INVENTOR(S) : Yagi et al.

It is certified that error appears in the above-identified patent and that said Letters Patent is hereby corrected as shown below:

Claim 1, line 26, before "spaced" insert

--is--

Claim 15, line 16, delete "leans" and insert

--means-- therefor.

Signed and Sealed this

Twenty-seventh Day of March, 2001

Attest:

NICHOLAS P. GODICI

*Attesting Officer*  *Acting Director of the United States Patent and Trademark Office*